United States Patent [19]
Hirai et al.

[11] Patent Number: 5,798,622
[45] Date of Patent: Aug. 25, 1998

[54] NONCONTACTING ELECTRIC POWER TRANSFER APPARATUS, NONCONTACTING SIGNAL TRANSFER APPARATUS, SPLIT-TYPE MECHANICAL APPARATUS EMPLOYING THESE TRANSFER APPARATUS, AND A CONTROL METHOD FOR CONTROLLING SAME

[75] Inventors: Junji Hirai; Yoshiji Hiraga; Kenji Hirose; Yuji Nitta; Hiroyuki Hamamoto; Kenji Nomura, all of Iruma, Japan

[73] Assignee: Kabushiki Kaisha Yaskawa Denki, Kitakyushu, Japan

[21] Appl. No.: 674,858

[22] Filed: Jul. 3, 1996

Related U.S. Application Data

[62] Division of Ser. No. 193,009, Feb. 17, 1994, Pat. No. 5,637,973.

[30] Foreign Application Priority Data

Jun. 18, 1992 [JP] Japan ................... 4-159614
Jul. 15, 1992 [JP] Japan ................... 4-188306
Dec. 7, 1992 [JP] Japan ................... 4-351781

[51] Int. Cl.$^6$ ........................................ G05B 1/06
[52] U.S. Cl. ................... 318/16; 318/640; 324/97; 323/355; 323/902
[58] Field of Search ..................... 318/560, 640, 318/16, 254; 336/175, 118, 120, 84 C, 117, 115, 130, 131; 324/97, 207.17, 158 MG, 167, 173; 323/355, 362, 902

[56] References Cited

U.S. PATENT DOCUMENTS 5,055,775  10/1991  Scherz et al. ................ 324/167
5,347,256  9/1994  Yumiki et al. ............... 336/84

*Primary Examiner*—John W. Cabeca
*Attorney, Agent, or Firm*—Oblon, Spivak, McClelland, Maier & Neustadt, P.C.

[57] ABSTRACT

A noncontacting power transfer apparatus, a noncontacting signal transfer apparatus and a separate machine apparatus that uses these couplers are disclosed. The power coupler is composed of a primary side and a secondary side that are fixed to a static unit and rotatable unit of the machine apparatus, respectively, such that its output does not vary with arbitrary rotation by the rotatable unit. The signal coupler is composed of receiving side portion having a electric-to-light conversion device that converts an electric signal to an optical signal of rotational symmetry relative to the axis of rotation of the rotatable unit and a photoelectric conversion device that converts an optical signal to an electric signal. Accordingly, the rotatable unit can be supplied with power from the static unit even while rotating, and moreover, can communicate with the static unit. Further, the rotatable unit can be easily attached to the static unit and can be removed from the static unit.

16 Claims, 31 Drawing Sheets

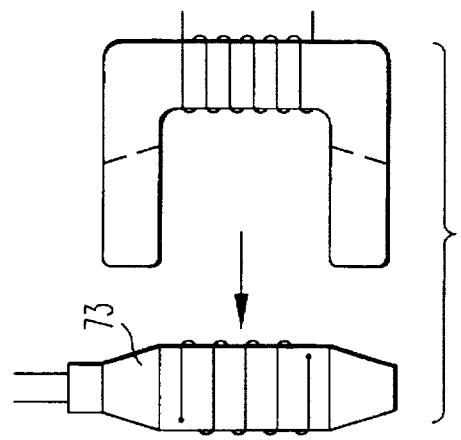
*FIG. 7D*
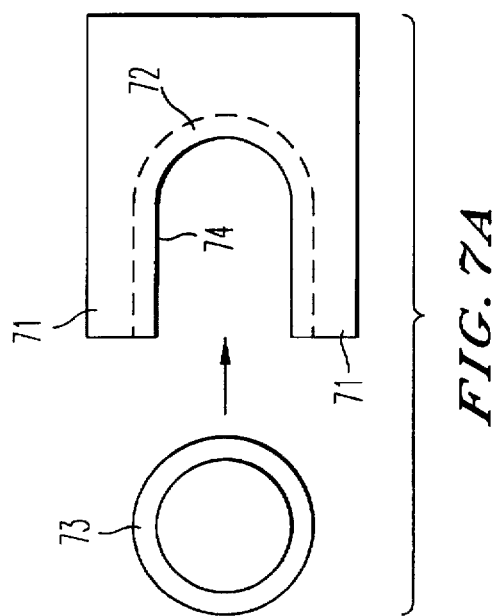
*FIG. 7A*
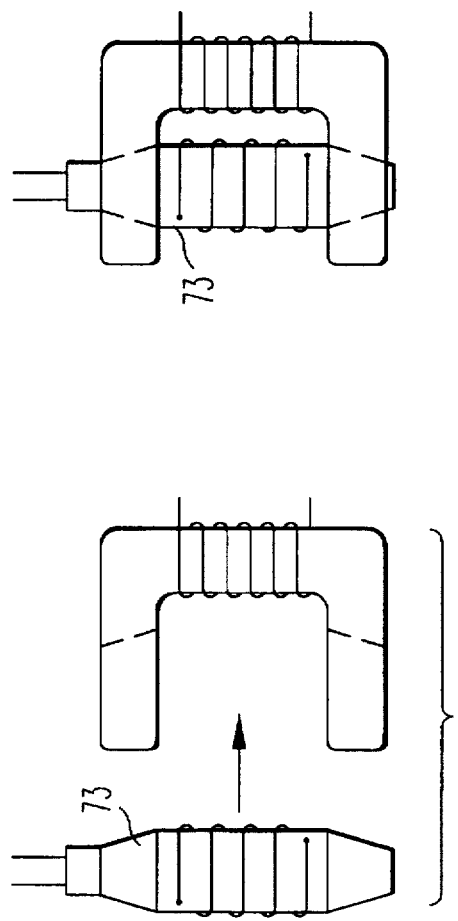
*FIG. 7C*
*FIG. 7B*

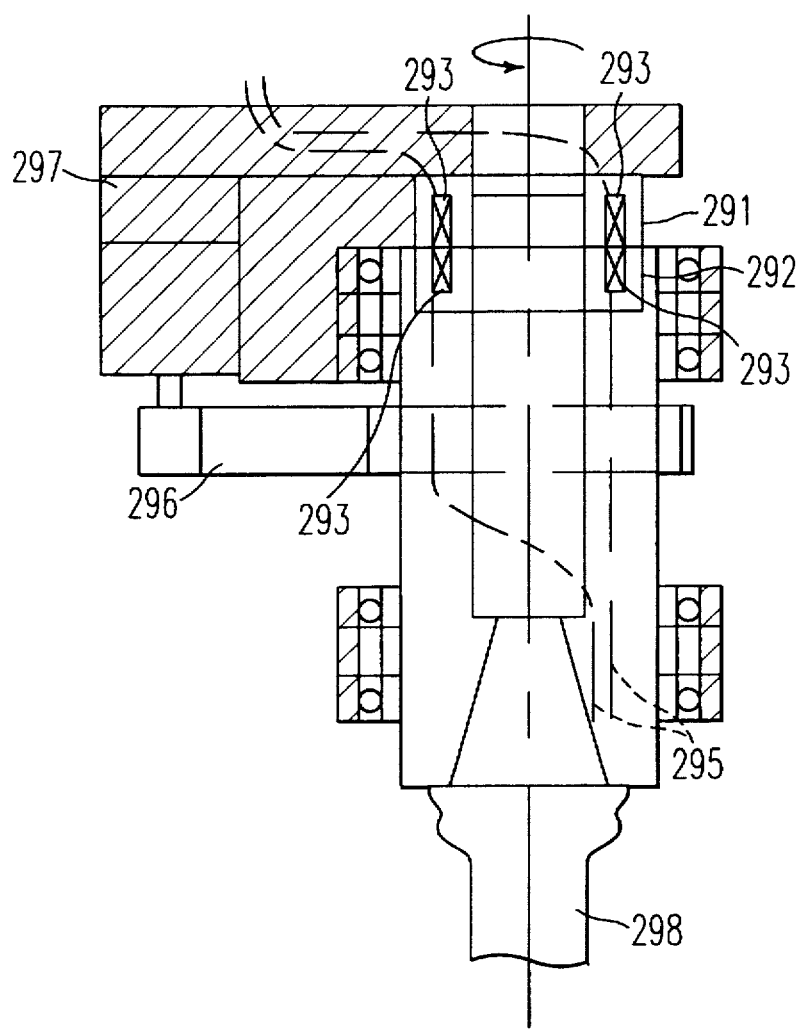

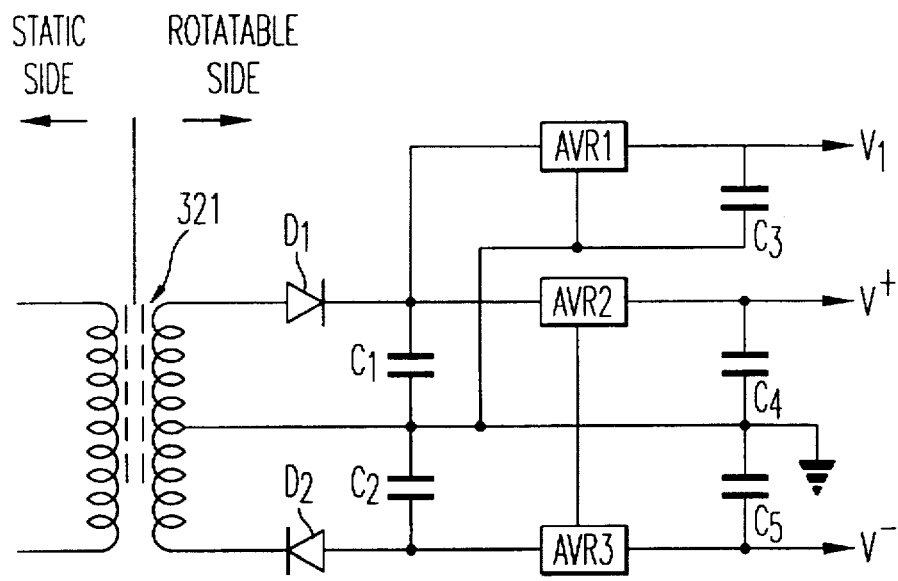
FIG. 31
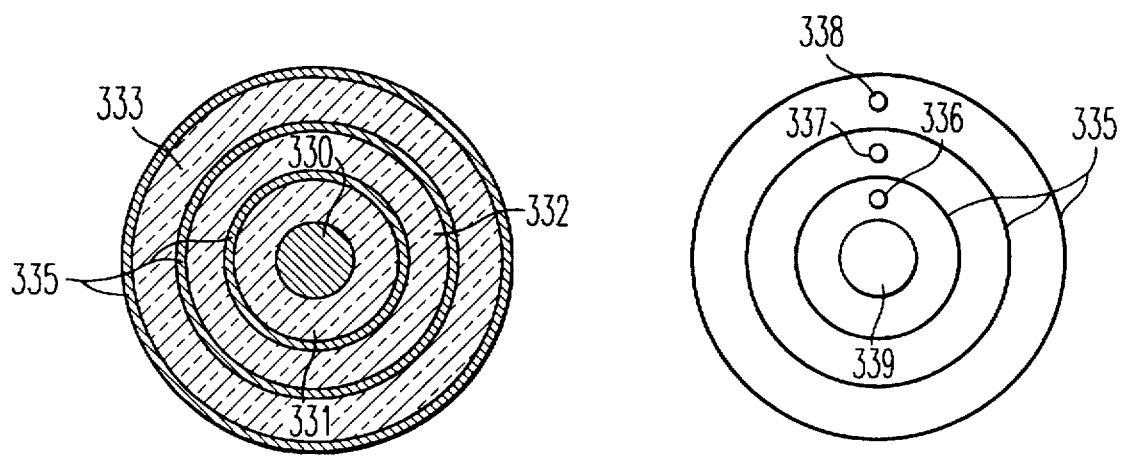
FIG. 32A
FIG. 32B

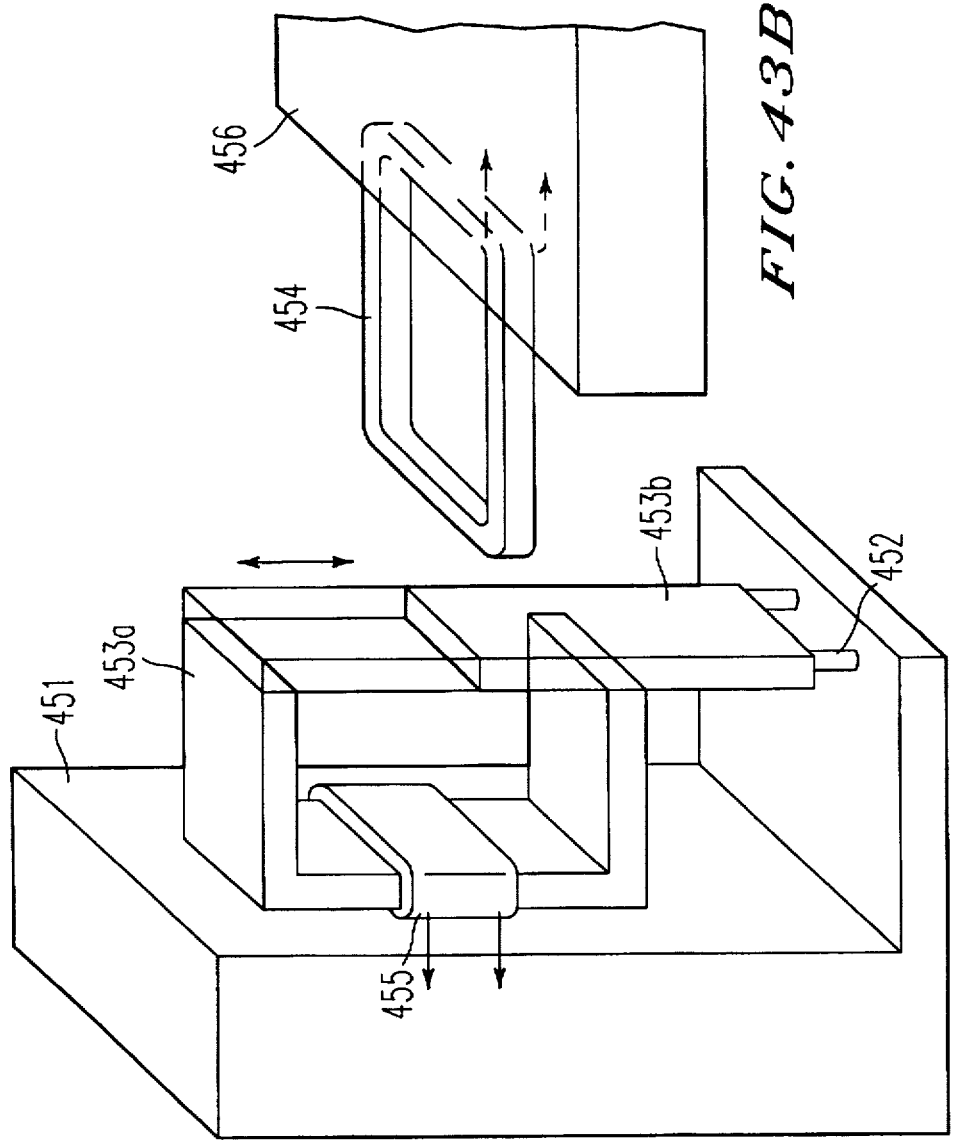

NONCONTACTING ELECTRIC POWER TRANSFER APPARATUS, NONCONTACTING SIGNAL TRANSFER APPARATUS, SPLIT-TYPE MECHANICAL APPARATUS EMPLOYING THESE TRANSFER APPARATUS, AND A CONTROL METHOD FOR CONTROLLING SAME

This is a Division of application Ser. No. 08/193,009, filed on Feb. 17, 1994, filed as PCT/JP93/00822, on Jun. 18, 1993, U.S. Pat. No. 5,637,973.

FIELD OF THE INVENTION

The present invention relates to a transfer mechanism that transfers electric power or signals to an electric load provided in a mobile or rotatable unit and relates to a dividual or split-type mechanical device that employs such transfer mechanisms. The present invention further relates to a control method of the split-type mechanical apparatus. In addition, the present invention relates to a transmitting system that uses the transfer mechanism of electric power and signals to transmit information on a rotating shaft that rotates at high speed.

BACKGROUND OF THE INVENTION

There has recently been a growing demand for autonomic decentralization of a machining system in an entirety of a machine system including robots and machine tools wherein the machining system is divided into independent functional units having control functions and machining functions of their own, i.e., autonomous units, wherein these units, maintaining their independence, carry out a coordinated machine work by effecting communications between a static functional unit (hereinafter referred to as a static unit) and movable functional units as well as mutually between the movable functional units for exchanging commands and information.

Dividing the machining system into a plurality of functional units in this way enables the optimum combinations of a plurality of functional units to fit each particular working object as the occasion demands, and consequently, offers the advantage that a single machine plant may serve for carrying out a wide variety of functions.

However, dividing the processing system into functional units is by no means obvious. For example, determining what extent of the apparatuses within the machining system should be consolidated as one unit presents one technical problem. In addition, it is to be desired that the attachment and removal of each functional unit be easy, and moreover, that an electric power transfer system and a communication system be automatically established between a movable functional unit and the static unit upon attachment of the movable functional unit to the static unit. This is particularly essential in the field of machine tools for realizing complete automatization of operation of jigs and for electrically controlling such operations as positioning, centering, and clamping a workpiece on a pallet as it moves from a setup process to a work process.

In addition, even in the case that a functional unit, for example a servomotor, is not physically separable from the static unit, a way of controlling the servomotor driven on a rotating body making multiple rotations is also becoming desirable. This applies to such cases as, for example, the rectilinear drive of a machine post mounted at the tip of the main shaft of a machine tool by an electric motor, or the electrical powering of a lathe head chucking section, or to a case in which the main shaft of an electric motor is mounted on a rotating index table. In such a case, in order that the control signals and electric power to drive the electric motor is supplied from a static unit, it is necessary that the electric power supply system and communication system always operate stably for any rotations of the rotating body.

A general survey will next be presented of the prior art relevant to the present invention from the viewpoint of the above-described current state of mechanical engineering.

FIG. 1 is a block diagram showing the basic structure of an electric motor control of the prior art.

A power source 11 inputs electric power of commercial frequency and supplies main power supply S12 and control power supply S13 to controller 12. The controller 12, driven by control power supply S13, is composed of position amplifier $12_1$, speed amplifier $12_2$, differentiator $12_3$, current amplifier $12_4$, and power switch $12_5$, thereby modulating and supplying the main power supply S12 to the servomotor 13 in response to a position command S11 fed from the upstream system. The detector 14 detects the position of the servomotor 13 and feeds back a position signal S15 to the position amplifier $12_1$ (position loop). The position amplifier $12_1$ generates a speed command from position command S11 and position signal S15. The differentiator $12_3$ differentiates position signal S15 and generates a speed signal. The speed amplifier $12_2$ inputs the speed signal and speed command and outputs a torque command (speed loop). The current amplifier $12_4$ compares the torque command and current signal (current detector value) S14 and modulates the current to be supplied to the servomotor 13 by controlling the power switch $12_5$. In this way, control of the prior art of a servomotor is carried out with a servocontroller system including a power source, a position detector and a servocontroller all being fixed based on the premise that any of the constituent parts will not be removed.

In the field of machine tool working, work is carried out for example, by controlling the positioning of a tool post 24 at the end of a main shaft 21 (facer machining center) as shown in FIG. 2, or by chucking a workpiece 34 through chucking jaws 33 driven by a chucking motor 32 at the shaft end of a main motor 31 or spindle unit as shown in FIG. 3 through signal communication with the rotation shaft and through additional power supply other than the rotation power to the rotating shaft. In such cases, however, because the supply of electric power and signals could not be easily achieved in the prior art, methods have been used such as arranging, within a hollow shaft of the main motor 41 or spindle unit, a coaxial shaft 43 for transmitting power in the form of mechanical power, as shown in FIG. 4, but due to problems relating to machining accuracy and long-term reliability, it has been extremely difficult to put this approach into actual use at a low cost. FIG. 4 shows a case in which the mechanical power is used to drive bevel gears $44_1$, $44_2$ to move a traveling pedestal.

In machine tool working, there has also been great demand for controlling an actuator provided at an end of a main shaft, and otherwise for sending information to a workpiece, jig, or tool at the end of a main shaft, or monitoring the conditions of these components by means of detectors. For example, in a chucking device attached at an end of a spindle head driven with a hydraulic cylinder, because the effective chucking pressure decreases due to the centrifugal force acting on the workpiece as the rotational speed of the spindle increases, it is desirable to effect on-line control through feedback of chucking pressure. Even when actual control of the chucking pressure cannot be realized, there remains a demand for on-line monitoring of the chucking pressure.

In-process monitoring of the state of a tool attached at the end of a spindle head during machining, prediction of breakage of a tool or confirmation of breakage is an essential item for effecting continuous 24-hour processing in FMC. For this reason, it is desirable to have sensor information (for example, information on tool tip temperature, vibration, acoustic emission, etc.) sensed at the main shaft end and returned during machining to an NC control device in real time. It is furthermore necessary to have measured position information on the location ahead of the spindle head (for example, the gap between tool and workpiece), and more basically, feedback of sequence signals such as limit switch signals in an ATC collect chuck.

As explained above, despite the strong demand for obtaining on-line information beyond the main shaft, transmission of the information by wiring cannot be used, because this involves a difficulty of wiring from a part rotating at high speed to a static part. Further, in order to obtain this information reliably, the detectors must in nearly all cases be mounted at the end of the main shaft, and consequently, the detectors must be supplied with electric power from the outside. Mounting batteries at the end of the main shaft to supply power is conceivable but usually not practical due to a large increase in weight of the portion that rotates at high speed as well as to the difficulty of exchanging batteries. Directly coupling a rotary electric generator to the main shaft to obtain power through rotation of the main shaft is also conceivable, but this course would not provide sufficient power when the shaft is at rest or rotating at a low speed. As a result, the necessity remains for some method of transmitting electric power for the detectors from the static part to the end of the main shaft, and conversely, transmitting detector information from the end of the main shaft to the static part, by way of the high-speed rotating part and independently of the rotating state of the main shaft.

As a method of the prior art, there are examples in which power supply and signal transmission are carried out by arranging slip rings coaxially with the main shaft, but this method has proved impractical in such a case as the main shaft rotates at high speeds of over several thousand rpm, because there is a tendency for problems such as noise generation caused by contact abrasion and poor contact.

In multi-articulated robots and SCARA robots, power supply and signal communication for every output shaft of servomotors have been achieved with a large number of wires, but problems are encountered in that the range of movement of the robot arm is restricted by turn-aside of the wiring and long-term repeated operations lead to fatigue and breakage of the wiring.

Regarding multi-articulated robots, a solution to the above-described turn-aside problem has been proposed in Japanese Patent Laid-open 93-13796. In this multi-articulated robot, a first arm is driven by a direct-drive motor installed in a static shaft. A second arm and a tool shaft are driven by way of pulleys supported by the static shaft, the rotation shaft of the second arm, the tool shaft and rotation transmission means (time belt) linking the pulleys. As to the wiring, a first slip ring is provided around the outside of the direct drive motor for driving the first arm, a third slip ring is provided around the outside of the tool shaft at the end of the second arm, and wiring within the base is connected by way of the first slip ring to the third slip ring through the hollow rotation shaft at the end of the first arm, and further, is connected to the hand through the hollow tool shaft. In this way, the first arm, second arm, and wrist do not interfere with each other and rotation greater than 3600 is possible without tangling or break of the wire. However, in this multi-articulated robot, the slip ring is used for the transfer of electric power and signals to the tool shaft.

In addition to the use in multi-articulated robots as described above, contact slip rings have been used for supplying power and communicating signals to multiple-rotation bodies, but here, improvement of reliability is limited by problems of stability and electrode wear during high-speed rotation, and when assembled in a machine, exchange operations are difficult. Furthermore, the adoption of this method of electrode contact is rendered essentially impossible due to problems of maintaining reliable electrical contact when exposed to the metal chips and cutting oil mist present in the working ambience of working machinery.

SUMMARY OF THE INVENTION

The first object of the present invention is to provide a electric power transfer apparatus and a signal transfer apparatus that can supply, without direct electric contact, electric power to a movable or multiple-rotatable body and to perform, without direct electric contact, communication of signals with the movable or multiple-rotatable body.

The second problem of the present invention is, presupposing the use of the above-described apparatus, to provide an autonomic decentralized servocontrol system, and a servocontrol method using the system.

The third problem of the present invention is to provide a rotary apparatus that can supply power to an operating machine established on a rotating shaft from a static part, and moreover, that can transfer signals between the rotating shaft and the static part.

The fourth problem of the present invention is, presupposing the use of the above-described apparatus, to provide a device capable of transmitting information at the end of the main shaft of an electric motor to the static part at real time.

The fifth problem of the present invention is to provide a noncontacting power supply system that allows easy establishment of an electric power transmission system when mounting a movable body to the static part.

To solve the above-described problems, the noncontacting electric power transfer apparatus of the present invention comprises: a split-core made up of a first core and a second core that are secured to a static unit and a rotatable unit, respectively, and that, through gaps between the cores, make up a magnetic circuit the magnetic path length of which does not change when the rotatable unit rotates arbitrarily; a first coil that is connected to the high-frequency alternating current power source established in the static unit and provides magnetomotive force to the magnetic circuit; and a second coil connected to a power-receiving device secured to the rotatable unit, the second coil being arranged to link with the magnetic flux that passes through the magnetic circuit.

Because the magnetic path length of the magnetic circuit does not change despite arbitrary rotations of the rotatable unit, it is rotation-invariant. As a result, the magnetic flux linking with the second coil depends only on the magnetomotive force and does not depend on either speed or the angle of rotation of the rotatale unit. Accordingly, rotation-invariant electromagnetic motive force is generated in the second coil despite arbitrary rotation (multiple rotations, high-speed rotation) of the rotatable unit.

In addition, because the first and second cores secured to the static unit and rotatable unit, respectively, are split across the core gaps, electric power is transferred without direct electric contact, and the rotatable unit can easily be detached and separated from the static unit. As a result, this construction is suitable for power transfer in a dividual or split-type machine apparatus.

The first noncontacting signal transfer apparatus of the present invention comprises electric-to-light conversion means affixed to the transmitter for converting an electric signal to be sent to a light signal of rotation symmetry with respect to the axis of the rotation of the rotatable unit; and photoelectric conversion means affixed to the receiver for receiving the light signal emitted by the electric-to-light conversion means and converting it to an electric signal, wherein the transmitter is the one of the static and rotatable units that transmits an electric signal and the receiver is the other of the two units that receives that signal.

Because the electric-to-light conversion means generates light signals in rotation symmetry relative to the rotation axis of the rotatable unit, the photoelectric conversion means that receives and carries out photoelectric conversion of this light signal outputs an electric signal having a rotation-invariant characteristic with respect to the rotation angle of the rotatable unit. This enables signal transmission stable for any relative rotation (including multiple rotation and high-speed rotation) between the transmitter and receiver.

The electric-to-light conversion means and the photoelectric conversion means are optically coupled, and therefore noncontacting, and consequently, the transmitter and receiver can easily be separated from each other. As a result, this construction is well-suited for signal transmission between a separable machine part and a static part, or between a separable machine part and another separable machine part.

The second noncontacting signal transfer apparatus of the present invention comprises an electric-to-light conversion element affixed to the transmitter for converting an electric signal to be transmitted to a light signal, and photoelectric conversion means affixed to the receiver for converting the light signal emitted from the electric-to-light conversion element to an electric signal, the photoelectric conversion means having a plane of incidence distributed in rotation symmetry relative to the axis of rotation of the rotatable unit, and the electric-to-light conversion element being located in the vicinity of the plane of incidence.

Because the photoelectric conversion means has a plane of incidence distributed in rotation symmetry relative to the axis of rotation of the rotatable unit, it outputs an electric signal having a rotation invariant characteristic with respect to the rotation angle of the rotatable unit. This enables signal transmission stable for any relative rotation (including multiple rotation and high-speed rotation) between the transmitter and receiver.

The electric-to-light conversion element and the photoelectric conversion means are optically coupled and therefore noncontacting, and consequently, the transmitter and receiver can easily be separated from each other. As a result, this construction is well-suited for signal transmission between a separable machine part and a static part, or between a separable machine part and another separable machine part.

The third noncontacting signal transfer apparatus of the present invention has a split core made up of a first core and a second core that are secured to a static unit and a rotatable unit, respectively, and that, through gaps between the cores form a magnetic circuit the magnetic path length of which does not vary when the rotatable unit rotates arbitrarily; and first and second coils that link with the magnetic flux that passes through the magnetic circuit; the first coil being connected to one of either the signal source or the signal processing apparatus established in the static unit; and the second coil being connected to the other of either the signal source or the signal processing apparatus established in the rotatable unit.

Because the magnetic path length of the magnetic circuit does not vary for any rotations of the rotatable unit (the magnectic path is rotation-invariant), the magnetic flux linking the second coil depends only on the magnetomotive force and does not depend on either the speed or the angle of rotation of the rotating unit. Accordingly, rotation-invariant electromotive force is induced in the second coil for any rotation (including multiple rotations and high-speed rotation) of the rotatable unit.

In addition, because the first core and second core secured to the static unit and rotatable unit, respectively, are separated across the core gaps, signals can be transferred without direct electric contact, and also the rotatable unit can be easily removed from the static unit. As a result, the construction is well suited to signal transmission between a static unit and a separable machine unit.

To achieve the above-described second object, the servo-control system of the present invention includes a static unit and a separable rotatable unit;

the rotatable unit having an autonomous motor unit, the autonomous motor unit being provided with at least a servomotor, a component of the power transfer apparatus, fixed to the rotatable unit for receiving the power for driving the motor without direct electric contact, driving means for driving the motor supplied with electric power transferred from the power transfer apparatus, a current controller for driving the driving means and that is a separated portion of a servo-controller for controlling the servomotor, a component of a first signal transfer apparatus fixed to the rotatable unit for receiving a torque command to be supplied to the current controller without direct electric contact, detecting means for detecting motor operation information, and a component of a second signal transfer apparatus fixed to the rotatable unit for transmitting the output signal of the detecting means without direct electric contact; and the static unit having at least a high-frequency power source, a component of the power transfer apparatus, fixed to the static unit for sending the electric power of the high-frequency power source to the autonomous motor unit without direct electric contact, a component of the second signal transfer apparatus, fixed to the static unit for receiving the output of the detecting means of the autonomous motor unit without direct electric contact; the other portion of the servo-controller for generating a torque command from both a command signal supplied from the upstream apparatus and the output signal of the detecting means; a component the first signal transfer apparatus, fixed to the static unit for transmitting the torque command outputted from the servo-controller portion in the static unit to the autonomous motor unit without direct electric contact.

In the motor control system of the present invention, regarding the servo-controller for controlling the motor, the portion of the servo-controller that depends on the type of motor is combined with the motor to form an autonomous motor unit, and the portion of the servo-controller that does not depend on the type of motor, i.e., the portion of the servo-controller that can be used universally for any motor, is arranged in the static unit. Further, the portion of the servo-controller that depends on motor type, for example, direct current motors, synchronous motors, or induction motors, is the current controller.

In this way, the autonomous motor unit is made light and compact. Many types of autonomous motor units can be prepared, allowing use of the most suitable unit for attaining an intended object. As a result, autonomous motor units can be used exchangeably while the servo-controller portion provided in the static unit can be used in common regardless of changes of the autonomous motor units.

To solve the third problem of the present invention, the noncontacting power and signal transfer apparatus of the present invention are established coaxially with the rotation axis of the rotary apparatus.

To achieve the above-described fourth object, the main-shaft-end information transmitter detects tip information at the tip of the main shaft of a motor rotating at high speed, and transmits the tip information to the static unit. It comprises sensor means that is attached to the main shaft for detecting tip information, power source means attached to the main shaft for rectifying a high-frequency alternating current supplied from the static unit and supplying stabilized power to the sensor means, a noncontacting power transfer apparatus for transmitting high-frequency electric power supplied from the static unit to the power source means without direct electric contact, and a noncontacting signal transfer apparatus for transmitting detection information detected by the sensor means to the static unit without direct electric contact.

The noncontacting power transfer apparatus and the noncontacting signal transfer apparatus here described refer to the apparatus of the present invention. As described above, the noncontacting power transfer apparatus, and the noncontacting signal transfer apparatus of the present invention are able to operate stably even for high-speed rotation of the rotatable unit. As a result, by establishing these apparatus between the main shaft and static unit, stabilized power can be supplied to the sensor means arranged at the main shaft tip, and main shaft tip information can be reliably transmitted to the static unit.

According to the method of controlling noncontacting power supply of the present invention, the servo-controller in the static unit generates and provides to an autonomous motor unit a torque command based on both the detected information by the detecting means and the command signal supplied from a prescribed upstream apparatus, and the autonomous motor unit operates the motor in accordance with the torque command sent from the servo-controller portion provided in the static unit.

As described above, the current controller portion of the servo-controller is established in the autonomous motor unit, and the servo-controller in the static unit transmits torque commands to the autonomous motor unit by way of the noncontacting signal transfer apparatus.

To achieve the above-described fifth object, the method of the noncontacting power supply of the present invention, comprises steps of mechanically opening one part of the high-frequency magnetic core that forms the magnetic circuit; inserting a secondary coil so that the secondary coil links with the magnetic circuit; after confirmation of insertion, closing the mechanically opened core; effecting high-frequency excitation of the primary coil to induce a voltage in the secondary coil; supplying electric power to the load connected to this coil on the movable body; then halting again the the high-frequency excitation of the primary coil; and mechanically opening the core in order to extract the secondary coil.

Because core gaps are interposed in the magnetic circuit of the previously-described noncontacting power transfer apparatus of the present invention, accurate processing is essential to ensure an invariant distance of the core gap when the rotatable unit is rotating.

In an apparatus to which the noncontacting power supply method of the open-close core type is applied, no core gap exists because the circuit of the magnetic core is mechanically closed, enabling easy manufacture. Nevertheless, multiple rotations are not allowed while power is being supplied.

BRIEF DESCRIPTION OF THE DRAWINGS

FIG. 7 is a view showing a construction for enabling the separation and joining of a U-shaped core and a cylindrical core;

FIG. 28 is a view showing the high-frequency transformer structure installed inside the main shaft unit;

FIG. 31 is a view showing the construction of a power source for PWM in the system of FIG. 30;

FIG. 32 is a view showing a multichannel information-transfer path by coaxial arrangement;

FIG. 43 is a structural view of an embodiment of the noncontacting power supply system of the present invention;

DETAILED DESCRIPTION OF THE PREFERRED EMBODIMENTS

Figure 1:
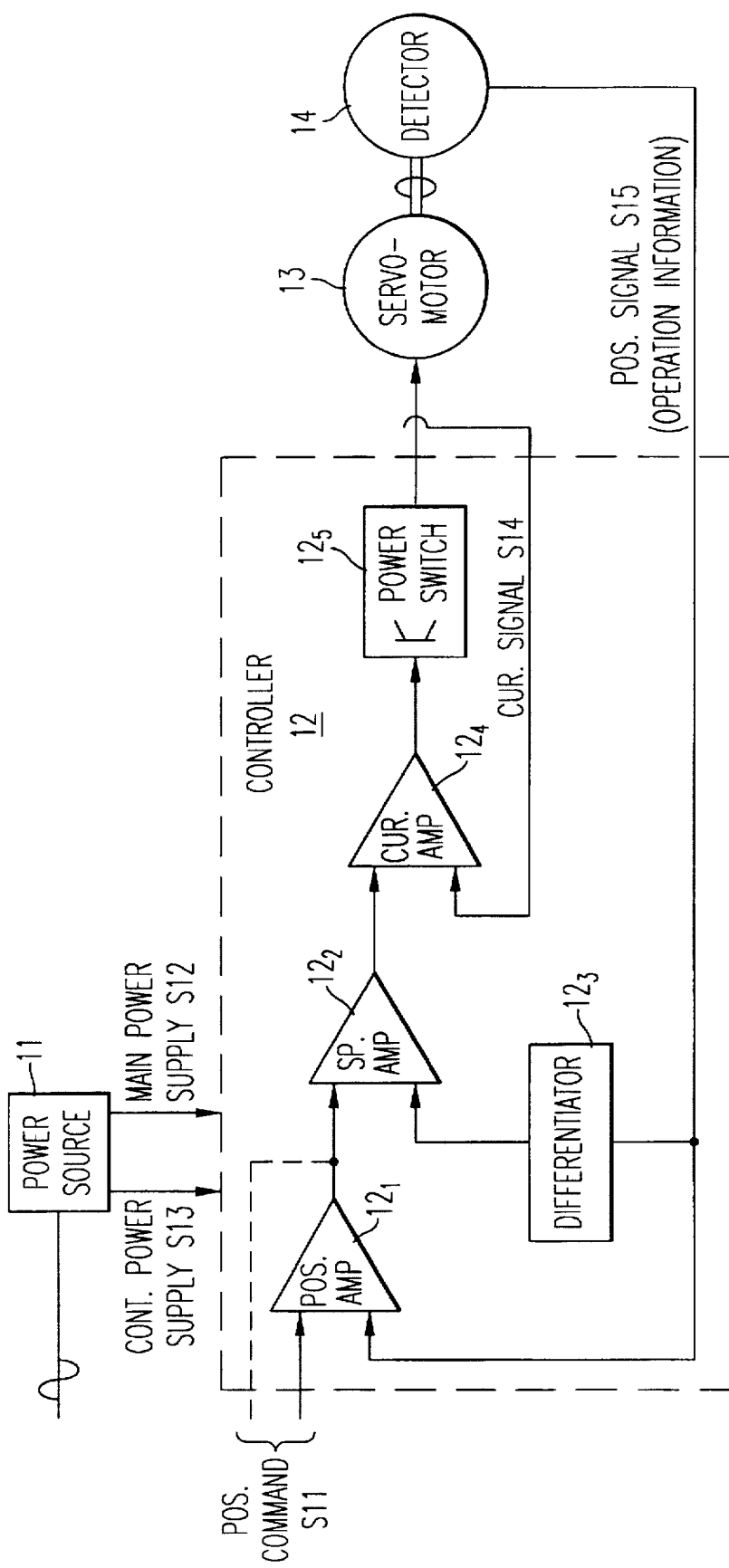
FIG. 1 is a block diagram showing the basic construction of servo-control of the prior art.
Figure 2:
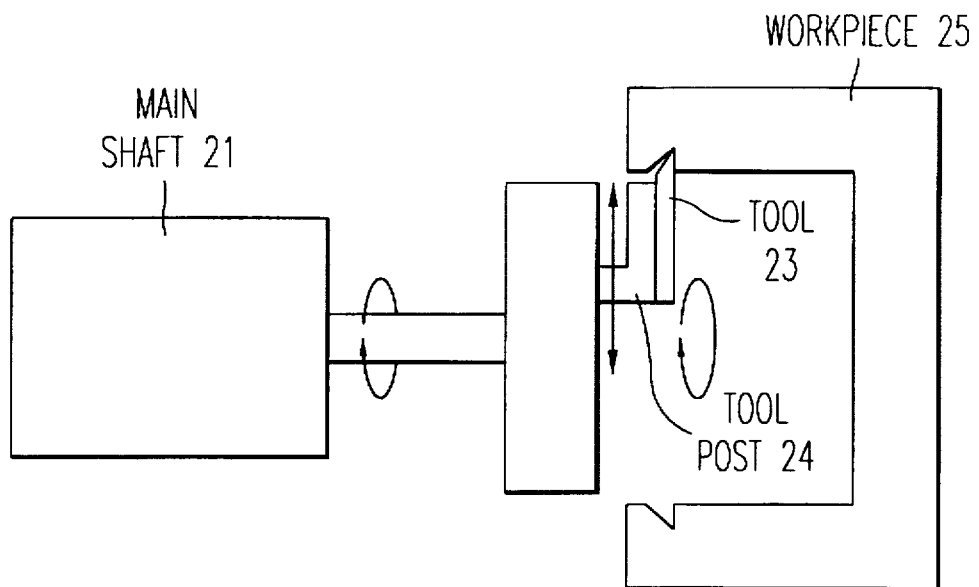
FIG. 2 is a view showing the tool post positioning on the end of a main shaft of a motor.
Figure 3:
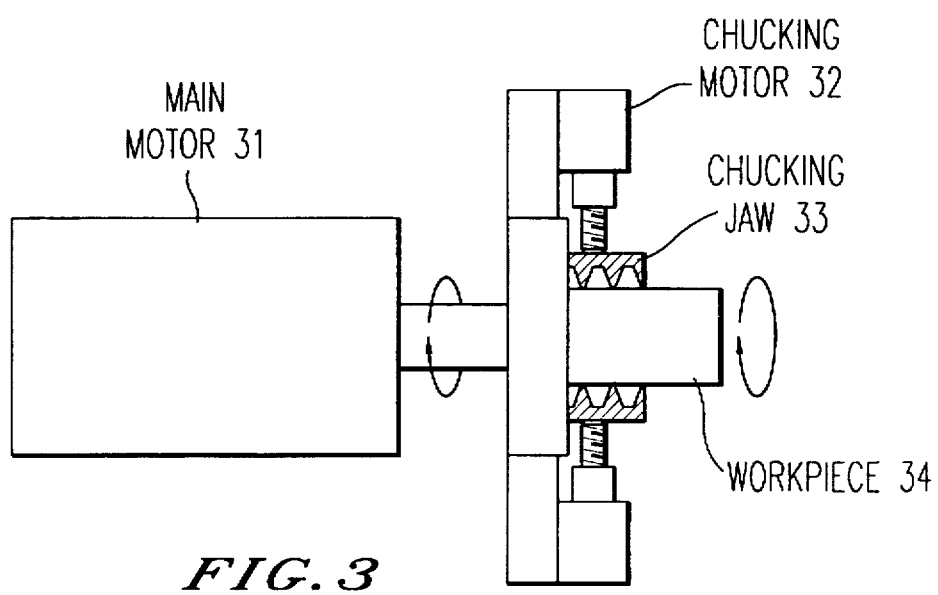
FIG. 3 is a view showing chucking of a workpiece at a main shaft tip of a motor.

As explained above, the present invention relates to a noncontacting power transfer apparatus, a noncontacting signal transfer apparatus, and various types of machine apparatus using these apparatus. The various embodiments here described appear to cover a broad spectrum at first glance, but all include a noncontacting power transfer apparatus (noncontacting power supply apparatus), and also a noncontacting signal transfer apparatus for receiving and supplying control signals and data signals between the apparatus on the power-supplying side and the apparatus on the power-receiving side in order to control the operating machine established on the power-receiving side. These apparatus hold promise of further development for processing machinery, robots, and other machines of the prior art, as will become clear from the embodiments described below. The present invention provides an apparatus having functions further developed through the application of the noncontacting transfer apparatus for electric power and signals of the present invention to various machines. Each of the embodiments hereinafter described realizes the object or, simultaneously, a plurality of the objects of the present invention. The embodiments will be explained in the following order:

1. The noncontacting power transfer apparatus and their applications to installing an additional work axis to a machine tool (FIGS. 5–13)
2. The noncontacting signal transfer apparatus (FIGS. 16–20)
3. The construction of the apparatus for supplying electric power to a rotation shaft and for receiving and supplying signals between the rotating shaft side and the power supply side (FIGS. 21–26)
4. A spindle tip information transmitter as the application of Item 3 (FIGS. 27–32)
5. Measurement of tool tip sizes of infeed tools and monitoring grasping power of chucking at a main shaft tip as the application of Item 3 (FIGS. 33, 34)
6. A servomotor and its split-type control circuit (FIGS. 35–40)
7. Multi-stage connections of noncontacting power transfer apparatus and noncontacting signal transfer apparatus
8. A noncontacting power supply apparatus with an open-close core and its application FIG. 5 shows the basic construction of a first embodiment of the noncontacting power transfer circuit of the present invention, (A) being a structural view, and (B) being a plan view.

A magnetic circuit (hereinafter referred to as a magnetic path) is made up of a fixed (static) U-shaped core 51, and a rotating core 53 of cylindrical shape inserted in taper holes 52 in the fixed core 51. A primary coil 54 is wound on fixed core 51, and a secondary coil 55 is wound on rotating (rotatable) core 53. For both coils litz wire is used for improved high-frequency characteristics. Because the terminals of secondary coil 55 must be taken out onto the rotating body, the lead wire is passed through lead-in holes 56, through the interior of the rotating core and out through upper lead-outs 57. By virtue of this construction, when rotating core 53 makes multiple rotations relative to the static part, any disturbances in the magnetic field and any variations in the effective magnetic path length are not caused, because such multiple rotations correspond to a sufficiently low electric frequency as compared with the high excitation frequency. Consequently, stable supply of electric power is possible in case there is no variation in the gap length of the slide portion due to the rotation.

Figure 5A:
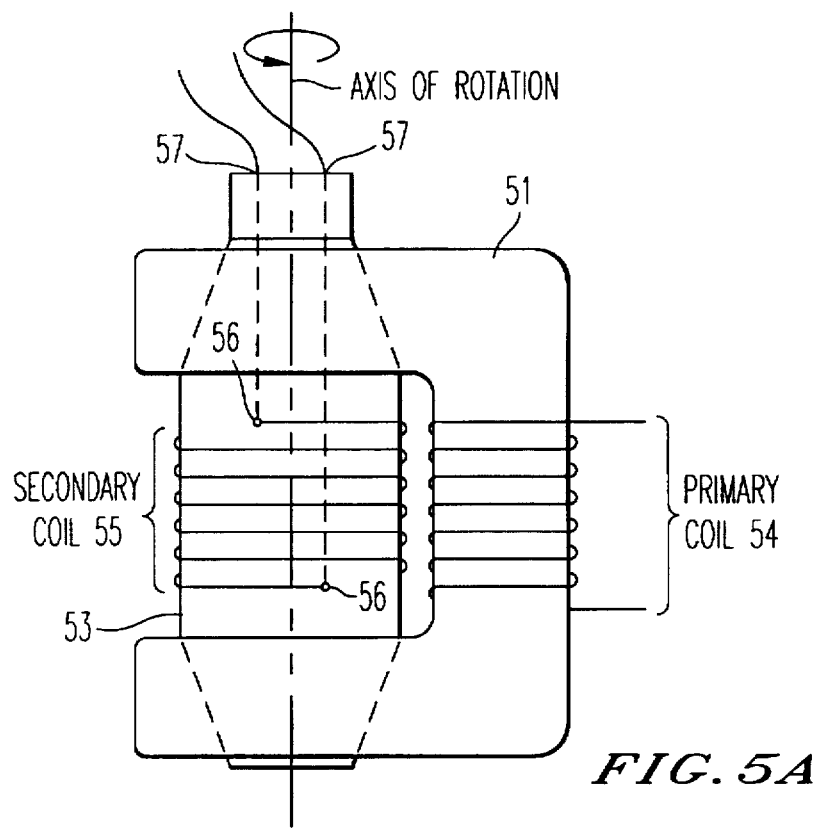
FIG. 5 is a view showing the basic construction of a noncontacting electric power transfer apparatus of the first embodiment of the present invention.
Figure 5B:
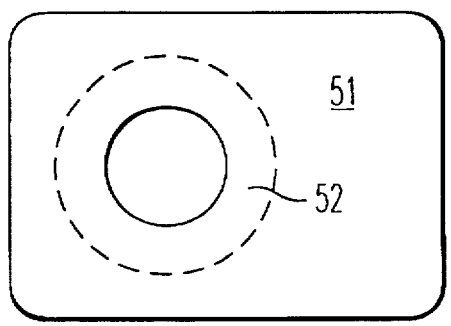
Figure 6:
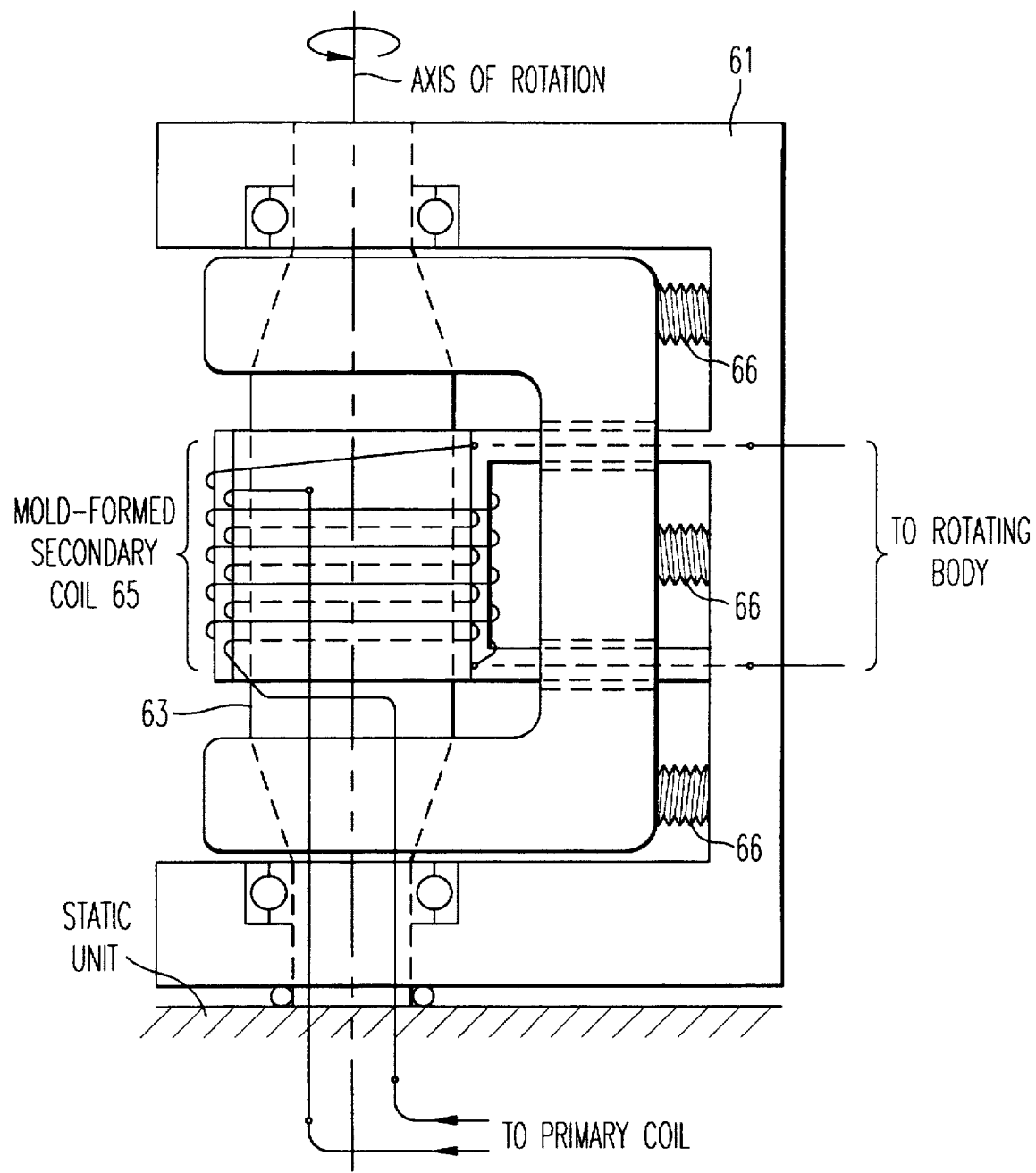
FIG. 6 is a variation of the apparatus of FIG. 5 in which magnetic coupling between the primary and secondary coils is strengthened.

FIG. 6 shows the construction of a modification of the apparatus of FIG. 5 in which the leakage in magnetic flux is reduced and coupling of the primary and secondary coils is strengthened. Specifically, in the structure of FIG. 6, the U-shaped core 61 is attached to the rotatable unit, and the cylindrical core 63 is secured to the static unit. Further, in order to strengthen the coupling between the primary coil and the secondary coil, the cylindrical core 63, on which the primary coil is wound, is covered with a mold-formed secondary coil 65 arranged so that the secondary coils will not contact with the primary coil. The formed secondary coil 65 is tightly fixed to the rotatable unit, and the electromagnetically induced voltage in this coil is supplied to the rotatable unit. In this construction, because the U-shaped core 61 is not a support of the secondary coil but rather serves to close the magnetic path, a construction is preferred in which the core 61 moves so as to fit to the slide surface in order to reduce the gap to the utmost. This object cannot be achieved if the core is secured tightly to the rotatable unit, but since there is no need to rigidly secure the core 61 in this construction, the U-shaped core 61 is loosely secured to the rotatable unit by loose joining members 66 so that the joining will not hinder rotation. In this way, the core is automatically attracted to the cylindrical core 63 by the magnetic attractive force and itself moves so as to reduce the gap, thereby acting, with the effect of the overlap winding of the secondary coil above, to realize electromagnetic coupling with little leakage of magnetic flux.

FIG. 7 shows the construction for separating and joining the U-shaped core and the cylindrical core 73. (A) showing the construction and (B) showing the joining and separating procedure.

As shown in the figure, on each of two parallel extending legs 71 of the U-shaped core, which is the fixed (static) portion of the construction in FIG. 5, a notch 74 is formed reaching from the end of the leg to the tapered hole 72 to produce an open form, resulting in a construction that allows the rotating body and the fixed portion to join or separate along the direction perpendicular to the axis of rotation of the rotating body, and this construction has useful possibilities for the structure of the machine system of the present interest. Specifically, as shown in the same figure, the power transfer apparatus is constructed and split in the order of coupling, power supply to the rotating body and decoupling, thereby allowing detachment as well as multiple rotations of the rotating body.

Figure 8B:
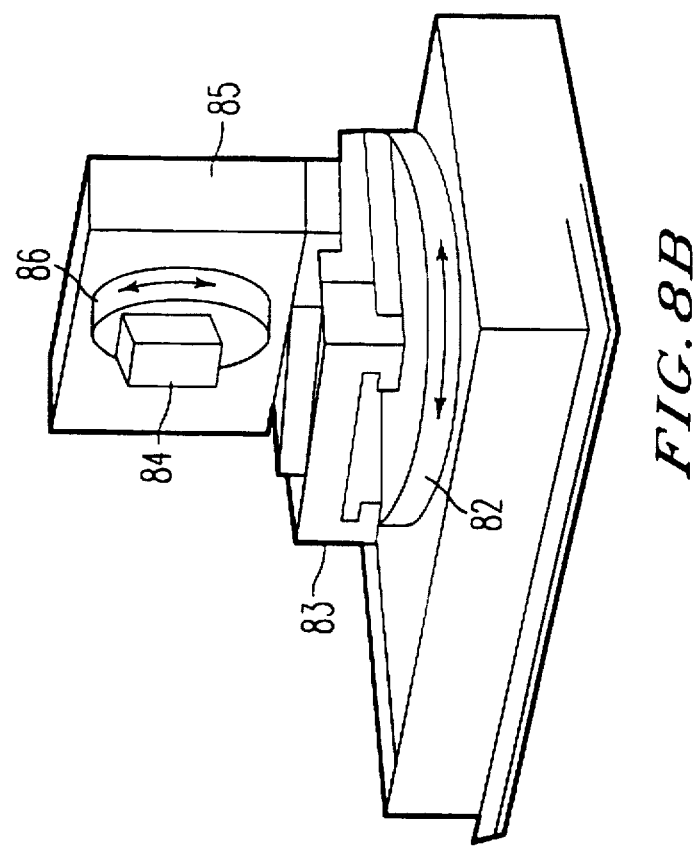
FIG. 8 is a view illustrating an application of the noncontacting power transfer apparatus to addition of a work axis in a machine tool.
Figure 8A:
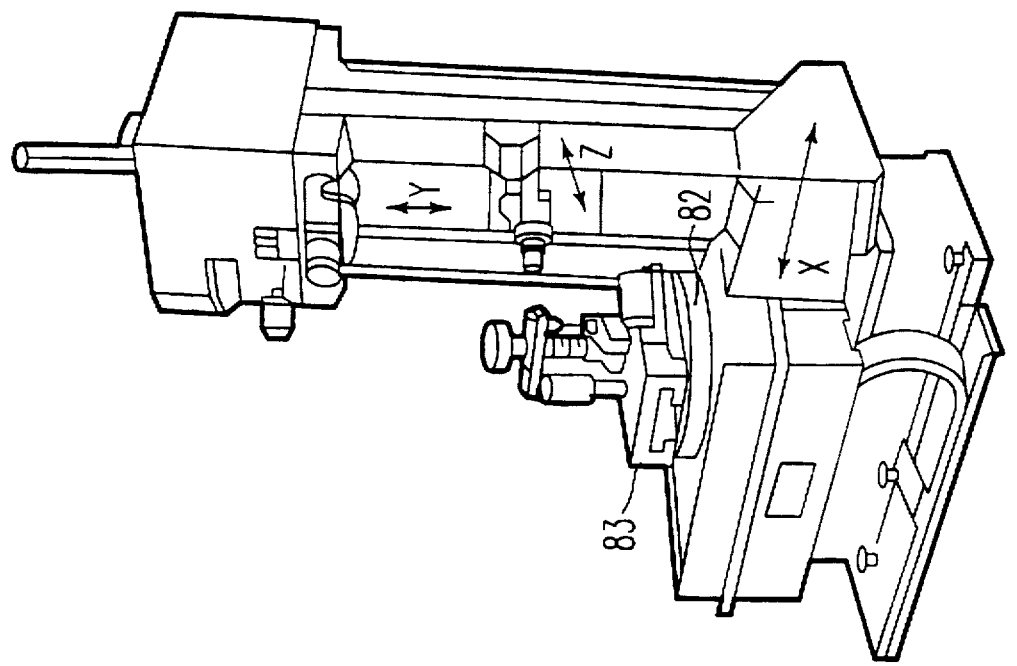

FIG. 8 shows an example of establishing an additional work axis in a machine tool (machining center) in which the power transfer apparatus of the type shown in FIG. 5 or 6 is advantageously used. (A) shows the state before establishing the additional axis to the pallet, and (B) shows the state following the establishment. Here, reference number 81 indicates a machining center having a rotating table 82 and a pallet 83, to which is attached a workpiece which can be worked on the four surfaces excluding the upper and lower surfaces. The pallet 83 to which the workpiece is clamped can be attached to the rotating table 82 through a pallet exchange operation, and if the functions of a vertical rotating table 86 is established on this pallet as shown in the figure, freedom of working can be increased significantly by allowing work of five surfaces. For this purpose, a servo-axis is mounted on the pallet (the servo-spindle is built in the rotating table 85). Upon exchanging the pallet 83 preceding the commencement of cutting, automatic power supply must be effected. However, this power supply cannot be effected through contact-type connection as is carried out in the normal environment, because contact-type power feed requires simultaneous multipolar (two or more points) contact, and due to difficulty in positioning, such automatization is difficult. Furthermore, power feed by electrodes is virtually impossible in the work area of a machining center because of the difficulty of maintaining good electrical contact in an ambience of metal chips and cutting oil.

The application of high-frequency electromagnetic induction to power feed according to the present invention is therefore proposed. This offers advantages in that power transmission can be continuous in analogue wise and precise positioning or fitting is unnecessary, and further, it is relatively impervious to severe conditions. For example, even if the cutting oil used in a machining center is water soluble and highly conductive, the occurrence of an eddy current will not reach a level that can influence the power transmission characteristics, meaning that exposure to cutting oil will scarcely impede transmission. In addition, despite concern that metal chips created by cutting a workpiece may attach to the magnetic path and cause transmission loss due to the generation of eddy currents, in actuality, even with chipped magnetic powder disposed to adhesion due to attraction, the adhesion will not occur as long as the residual magnetic flux of the magnetic core is not large because the excitation frequency is high and, moreover, the polarity of magnetization alternates. Even if adhesion were to occur due to some other factor, cutting oil could be used effectively to wash away the offending material.

Figure 9C:
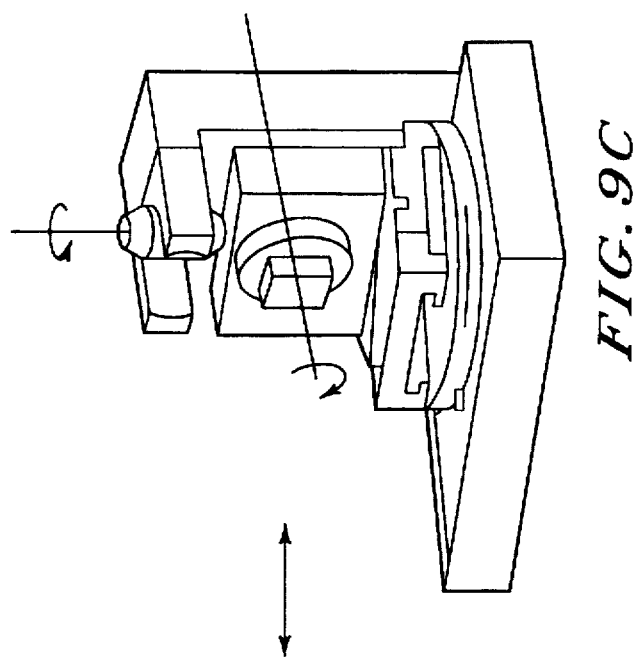
FIG. 9 is a view illustrating an application of the first embodiment to addition of a work axis onto a pallet.
Figure 9B:
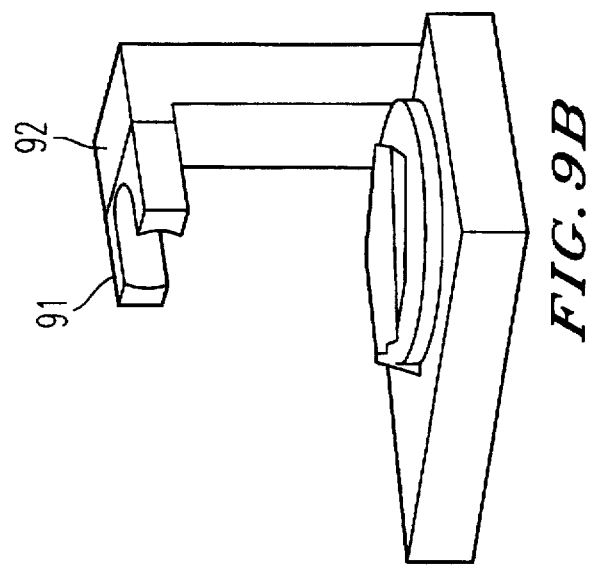
Figure 9A:
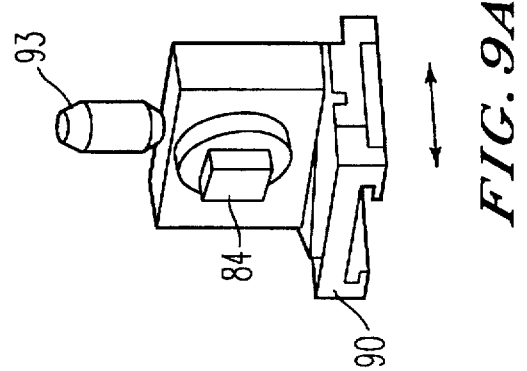

In FIG. 9 is shown a construction using a rotatable power transfer method that allows separation and coupling for realizing the work-axis addition shown in FIG. 8. (A) shows the fixed core 91 and rotating core 93 before mount by movement of the pallet 90, and (B) shows the state in which the fixed core 91 and the rotating core 93 are in a fitted state and power is supplied to the added axis (the servomotor for the added axis). As shown in the figure, through an arm 92 extending from the static part of the machining center, the fixed core 91 is accurately positioned in the vicinity of the rotation center of the rotating table. The rotating core 93 is arranged on the rotation axis of the pallet, and the lead wire from the secondary coil wound on the rotating core 93 is led into the pallet. As explained above, in automatic exchange (from (A) to (B) in the figure), because the pallet and rotation table are joined such that the axes of rotation coincide, a power transfer apparatus can be constituted in the form shown in FIG. 7. Even if the table rotates through indexing, power supply from the static machining center to the pallet can be continuously effected free of influence by the angle of rotation. The servo-spindle and servo-controller are provided inside the pallet, and the high-frequency voltage induced in the secondary coil is converted to DC voltage by the rectifying-smoothing circuit embeded in the pallet and used as main power and control power of the servo-controller. Moreover, control of the added work-axis and feedback of signals are carried out by a method not shown in the figure (for example, by high-frequency electromagnetic induction according to the same principle as the power transfer, or optical transfer such as by infrared light).

In this way, the application of high-frequency electromagnetic induction solves the problems of instability and abrasion encountered during high-speed rotation in the contact-type (slip ring) power supply of the prior art, and in addition, power can be transmitted to a multiple-rotating body free from the influence of the interposition of cutting oil or cut chips occurring in the operating environment of machine tools.

Accordingly, an apparatus is achieved that has an increased transmission efficiency, allows use even under the severe conditions of such as a machine tool environment, and effects power supply without direct electric contact even between bodies that are not only rotatable, but also separable and joinable relative to each other, and as a result, automatic exchange can be easily carried out, for example, between cutting work pallets, work tools, and heads in machine tool work, thereby contributing to the acceleration of automatization in manufacturing applications for limited-quantity large-variety production.

Figure 10:
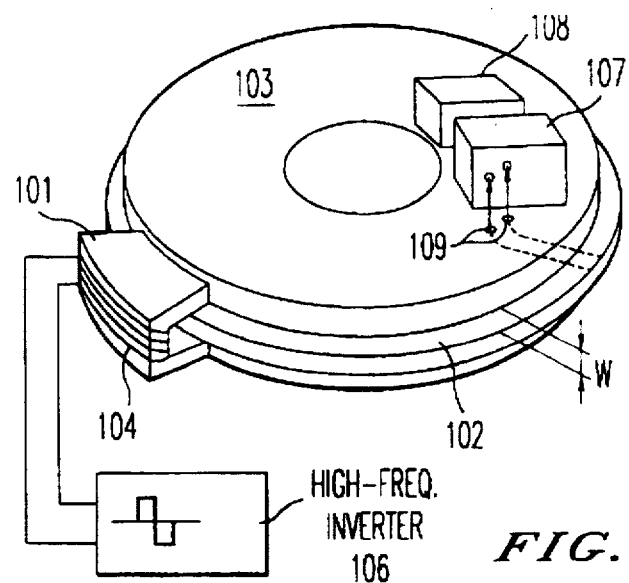
FIG. 10 is a view showing the construction of a noncontacting power transfer apparatus of the second embodiment of the present invention.
Figure 12:
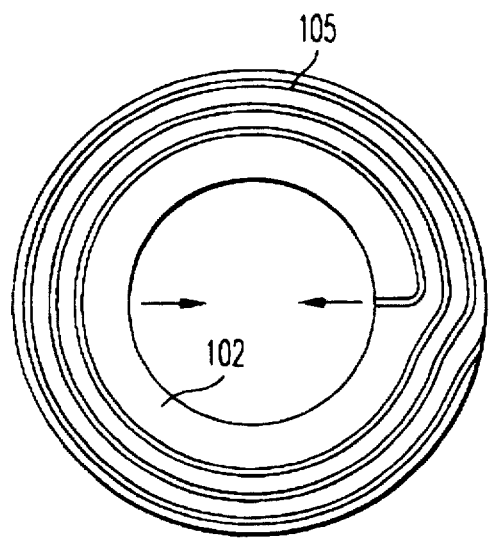
FIG. 12 is a view showing the construction of a secondary coil of sheet type.

FIG. 10 shows a construction of the second embodiment of the noncontacting power transfer apparatus of the present invention. FIG. 11 shows the construction of the magnetic circuit of the apparatus of FIG. 10, (A) being a case where the periphery of the rotating body is a non-magnetic substance, and (B) showing a case in which the periphery is a high-frequency magnetic substance.

An electrically insulating substance (non-magnetic substance) 102 is applied to the periphery of the rotating body 103, which is the object for power supply, and around this substance the secondary coil 105 is circumferentially arranged. Opposed to this assembly, a U-shaped high-frequency magnetic core (U-shaped core) 101, around which the primary coil 104 is wound, is arranged in a static part outside the circumference of the rotating body 103 so as to straddle the insulating substance 102 and the secondary coil 105. The end lead wire passes through a lead-out hole 109 and is led out towards the rotation axis so that the U-shaped core 101 does not contact the secondary coil 105 even when the rotating body rotates in relation to the static part. The primary coil 104, under excitation by means of a high-frequency inverter 106 in the static part, gives rise to main magnetic flux passing through the U-shaped core 101 and the insulating substance 102. Here, the width W of the insulating substance 102 is within a range sufficient for providing the electrical load capacity required to the rotating body but is made as thin as possible to suppress magnetic flux leakage to a low level. However, as will be explained below, this limitation is not necessary for a case in which the magnetic path is closed by making the part of the insulating substance 102 with the same magnetic material as the U-shaped core. In addition, when it is necessary that the rotating body be removable, the widths of both the insulating substance 102 and the secondary coil 105 are made smaller to allow removal from the U-shaped core.

In the secondary coil 105, high-frequency voltage occurs due to electromagnetic induction, and when the circuit of the secondary coil 105 is closed through the electrical load on the rotating body, current flows in order to compensate for a change in the magnetic flux produced by the primary coil (shown in the figure). As a result, the secondary induction voltage taken out onto the rotating body through lead wire lead-out hole 109 is thus supplied to an electrical load such as a motor or solenoid through voltage converter circuit 107 and the stabilizer circuit 108 on the rotating body as well as is used as power source for an information transmitter or detector not shown in the figure.

Figure 13:
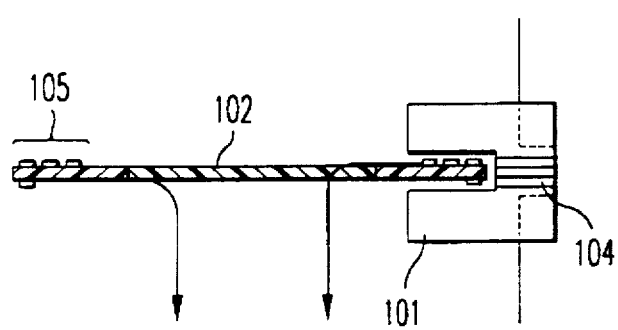
FIG. 13 is a side elevation view showing the arrangement of the rotating disk and U-shaped core of the apparatus of FIG. 10 in a case using a sheet-type secondary coil.
Figure 11A:
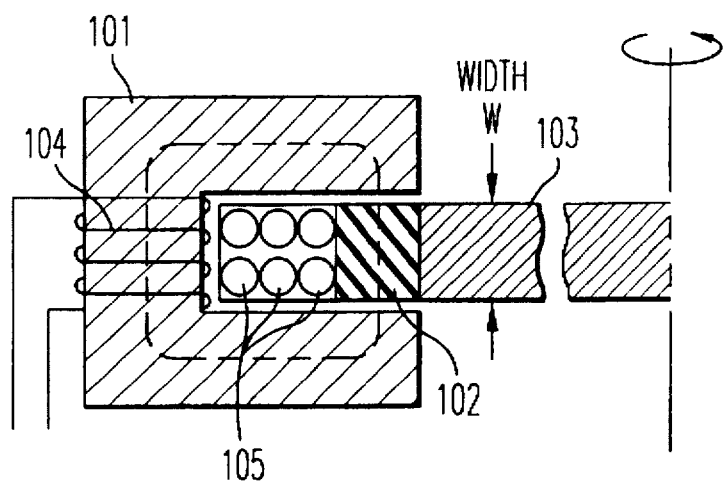
FIG. 11 is a view showing the construction of the magnetic circuit of the apparatus of FIG. 10.

Here, in cases when the material used for electrically insulating substance 102 is not a magnetic substance (in particular, a high-frequency magnetic material), magnetic flux leakage occurs in the magnetic path produced by the primary coil as shown in FIG. 11(A), but such a material may still serve for applications that allow some transmission loss (transfer loss) by keeping the width of the insulating substance 102 to the utmost minimum, as explained above. Accordingly, within the range of low-power transfer, it is advantageous to construct the insulating substance 102 and the secondary coil 105 as a print substrate and sheet coil as shown in the plan view of FIG. 12. FIG. 13 is a side elevation view showing U-shaped core and the rotating body with the secondary coil formed in a sheet coil.

Figure 11B:
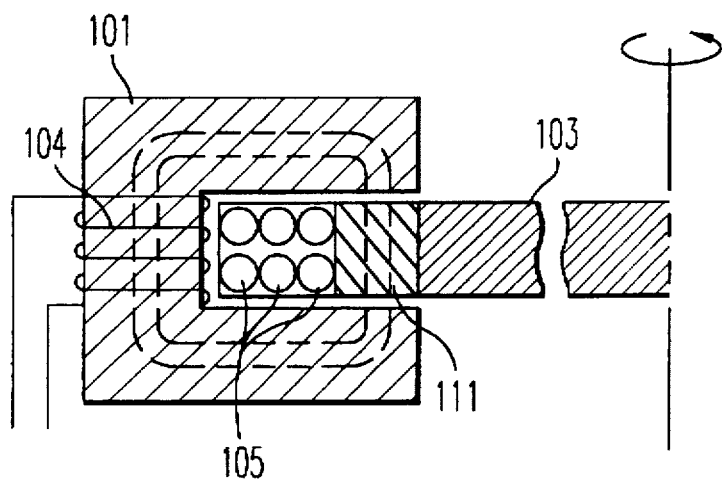

For applications that do not allow transmission loss due to magnetic flux leakage, the peripheral part of the rotating body 103 can be made of the same high-frequency magnetic material as is used for the U-shaped core 101. This is realized by arranging a ring-shaped core 111 around the periphery of the rotating body 103 so as to form a part of the magnetic path, as shown in FIG. 11(B).

However, since both of the cases illustrated in FIGS. 11(A) and (B) assume noncontacting power transfer, the existence of an air gap, however small or large, gives rise to leakage of magnetic flux, and it is therefore necessary to in some way arrange the structure to reduce this gap to the minimum.

In whatever case, in contrast to the contact-type transfer, power transfer by the above-described power supply method is superior because it is effected continuously in analogue wise, and because neither precise positioning nor fitting is necessary, and in addition, this method is advantageous in that the power transfer apparatus can stand up to severe conditions. For example, exposing the apparatus to cutting oil in the working environment of a machine tool will scarcely impede the power transfer. Further, despite the concern that adhesion of cut metal chips to the magnetic cores or air gap will cause transmission loss due to eddy currents, in actuality, because of the high excitation frequency and the alternating polarity, even adhesion by magnetic chips will not occur as long as residual magnetic flux is not large. Even should adhesion occur for some other reason, cutting oil may be used effectively to wash away the offending material.

According to the present embodiment, noncontacting power supply can be effected by merely arranging the secondary coil in the peripheral part without altering the structure of the rotating body itself. Further, an apparatus is realized that allows not only rotation but separation and joining, and which can operate in severe conditions wherein the apparatus is subjected to fouling by cutting oil and metal chips present in the working environment of a machine tool.

As a result, improved machining functions on an already existing multiple-rotation body (such as a round table) can be readily achieved. Such an apparatus is useful in, for example, realizing automatic establishment of an additional servo axis on a cutting work pallet and automatic exchange of work tools and heads in machine tool work, thereby contributing to the acceleration of automatization of manufacturing applications for limited-quantity large-variety production.

Figure 14A:
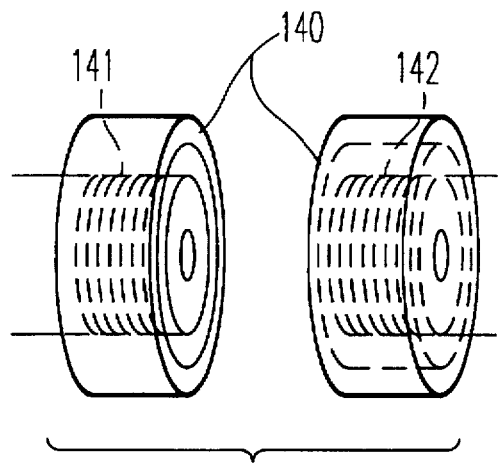
FIG. 14 is a view showing the construction of a pot-core type high-frequency transformer.
Figure 14B:
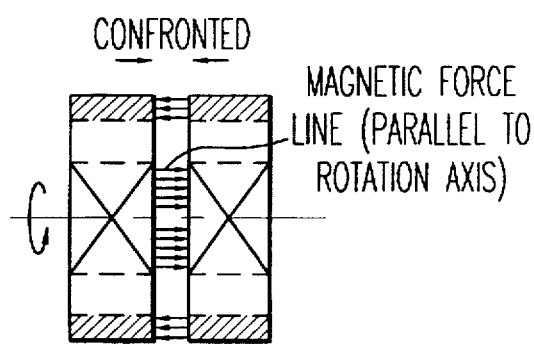
Figure 15A:
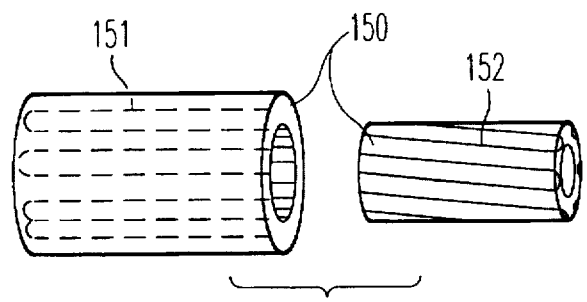
FIG. 15 is a view showing the construction of high-frequency transformer of a rotary-machine core type.

In regard to the frequently cited noncontacting power transfer apparatus of the following embodiments, simple explanations will be given of the technology of the prior art. There are cases using a pot-core as in FIG. 14, or a rotary-machine type core as in FIG. 15. In the case of a pot-core, a pot-core 140 on which is wound a primary coil 141 is made to confront a pot-core 140 on which is wound the secondary coil 142 with a gap therebetween, and power is transmitted by means of electromagnetic induction. Both of these pot-cores are of a high-frequency magnetic substance. Because this type is of flat-form structure, when provided within a motor or reduction arrangement, the design of the apparatus is little influenced by the enlargement of the form in the direction of the rotation axis, but as shown in FIG. 14 (B), the magnetic path is in the direction of the rotation axis, meaning that the magnetic flux that passes through the core tends to be limited by the upper limit of the magnetic flux density in the core material (the saturation characteristic). In another rotary-machine type core having a coaxial form in which another core is inserted inside the cylindrical core 150 (refer to FIG. 15A) in the same relation as the rotor and stator of a rotary machine, the magnetic path becomes perpendicular to the direction of the rotation axis, as shown in (B) of the same figure, with the result that the dimension of the axial direction of a motor or reduction arrangement incorporating this type of the core may increase, but with the advantage that, similar to normal motors, the magnetic flux per unit volume can be increased and a higher overall power rate (transmission power per unit volume) can be obtained. However, this type also requires that the electrical angle of one of the cores be skewed as shown in FIG. 15A in order that the magnetic path length does not change depending on the rotation angle. In the same figure, a skew has been applied to the inserted core.

All of these apparatus are split-type high-frequency transformers in which the primary coils 141, 151 (static side) of the split-type high-frequency transformer Tr are excited by means of high-frequency (sine wave or rectangular wave) inverter, and high-frequency voltage is produced by electromagnetic induction in the secondary coils 142, 152 (rotatable unit) that oppose across a slight distance. Here, the distance between the primary and secondary cores of the split-type high-frequency transformer Tr is made as small as possible to reduce the power loss due to the interposing air gap.

Further, although the primary and secondary cores may rotate relatively around the same axis, because there is no actual disturbance in the distribution of the magnetic field when the equivalent electrical frequency is below the above-described high-frequency excitation frequency, no time variation will occur in power transfer characteristic during rotation or stopping.

Figure 16A:
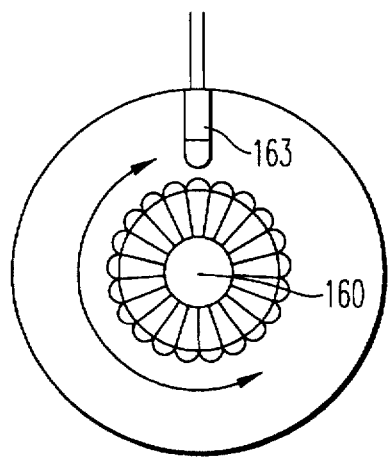
FIG. 16 is a view showing the construction of a noncontacting signal transfer apparatus of the third embodiment of the present invention and shows in particular the circular distribution of the diverging light-exitting ends of a group of optical fibers.
Figure 16B:
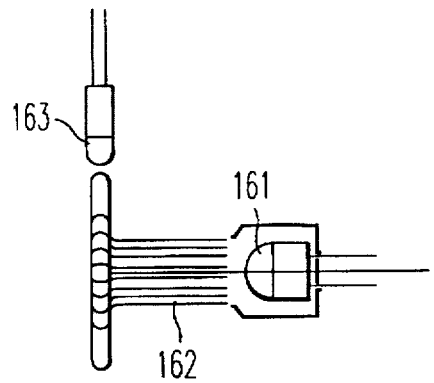
Figure 16C:
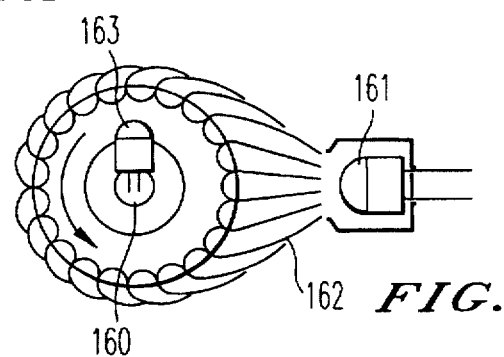

FIG. 16 shows the construction of a noncontacting signal transfer apparatus of a third embodiment of the present invention, (A) and (B) being a plan view and a side elevation, respectively, showing transfer of signals from the rotatable unit to the static unit, and (C) being a typical explanatory view of the apparatus when transferring signals from the static unit to the rotatable unit.

The present embodiment is an example using the branching function of optical fibers for transferring signals between the static unit and the rotatable unit. Light-emitting element 161 and optical fiber group 162 are fixed to the transmission side that transmits signals, while the light-receiving element 163 is fixed to the reception side that receives and processes the signals. The light-emitting element is an electric-to-light conversion element that converts an electrical signal to an optical signal, and the light-receiving element is a photoelectric conversion element. Either an infrared LED or a laser diode may be used as the light-emitting element 161, which have an output peak within a range of wavelengths in which attenuation does not occur in optical fiber transmission. The digital signal to be transmitted is in the form of a pulse train or in a serially converted form, and is converted to a light pulse signal by electric-to-light conversion of the light-emitting element 161 driven by the high-frequency drive circuit. The input end of the optical fiber group 162 is optically coupled to the light-emitting element 161 so that an emitted light pulse is guided and branched by the optical fiber group as shown in the same figure. The output (exiting) ends of the optical fiber group 162 are structured so as to distribute in rotation symmetry around the axis of rotation 160 of the rotatable unit so that the intensity distribution of the optical signals emitted by the light-emitting element 161 has virtually rotation symmetry relative to the axis of rotation at the output ends of the optical fiber group 162. Accordingly, for signal transfer from the rotatable unit to the static unit, the light path is branched radially from the axis such that the light path is not interrupted by electric and fiber wirings distributed around the perimeter of the axis of rotation, as shown in (A) of the same figure, and is moreover branched in sufficient number such that the light-receiving element of the static unit can take in light pulses in consistent phase and gain regardless of the rotation angle.

As to signal transfer from the static unit to the rotating unit, as shown in (B) of the same figure, the input ends of the optical fiber group 162 are coupled to the light-emitting element fixed to the static unit and the output ends of the optical fiber group are distributed surrounding a light-receiving element attached to the rotation axis such that light pulses will reach the light-receiving element in consistent phase and gain from any of the output ends of the fibers independent of the angle of rotation.

In FIG. 16, the static unit is on the outer side and the rotatable unit (rotation axis) is on the inner side for easily feasible construction, but a reverse construction is also possible in which the static unit is on the inner side and the rotatable unit is on the outer side.

Figure 17A:
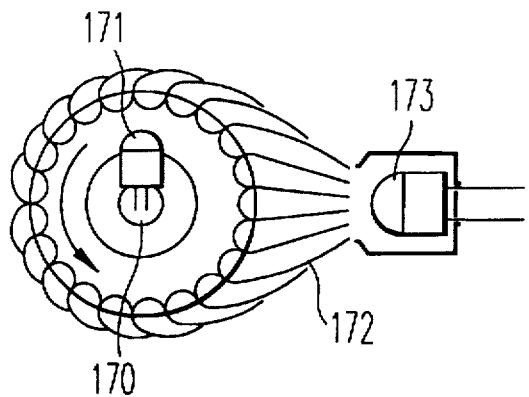
FIG. 17 is a view showing the construction of a noncontacting signal transfer apparatus of the fourth embodiment of the present invention, and shows the circular distribution of the branching incident ends of a group of optical fibers.
Figure 17B:
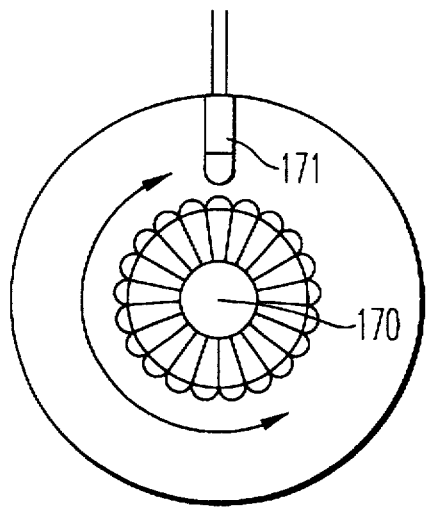
Figure 17C:
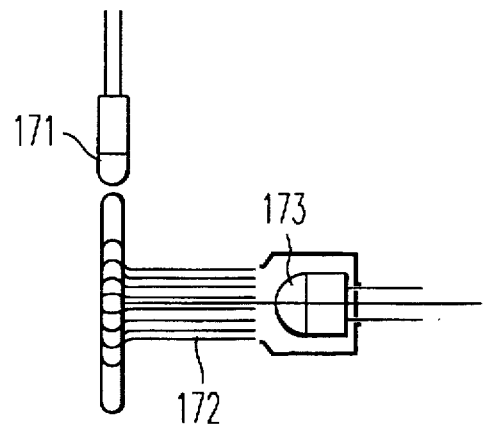

FIG. 17 is a structural view showing a noncontacting signal transfer apparatus of the fourth embodiment of the present invention, (A) being a typical view illustrating the structure in which a signal is tranferred from the rotatable unit to the static unit, and (B) and (C) being a plan view and a section view, respectively, of the apparatus for transferring a signal from the static unit to the rotatable unit.

This arrangement is similar to the apparatus of FIG. 16 in that it is provided with an optical fiber group 172 that branches in rotation symmetry relative to the rotation axis, but differs from that of FIG. 16 in that the converged ends of the optical fiber group 172 make up an output end optically coupled to the light-receiving element 173, and the branched ends are the incident ends facing the light-emitting element 171, the light-emitting element being arranged such that the light signal emitted by the light-emitting element can be taken in by any of the plurality of distributed fiber ends (a plurality of light-emitting elements may be used simultaneously). Accordingly, although the apparatus of FIG. 17 does not generate light signals in rotational symmetry, as does the apparatus of FIG. 16, light signals emitted from the same light source are guided to the light-receiving element when the rotatable unit rotates as well as when it is at rest. As a result, the output of the light-receiving element 173 provides a signal having virtually rotation-invariant characteristic with respect to the rotation angle of the rotating unit. In this case as well, the light-emitting element and the light-receiving element are fixed on the transmission side and reception side, respectively, but the optical fiber group 172 is fixed to the receiving side.

Figure 18A:
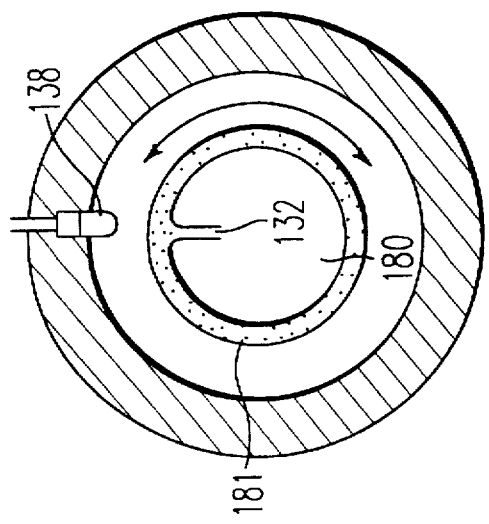
FIG. 18 is a plan view showing the construction of a noncontacting signal transfer apparatus of the fifth embodiment of the present invention, showing a construction using plane optical elements.
Figure 18B:
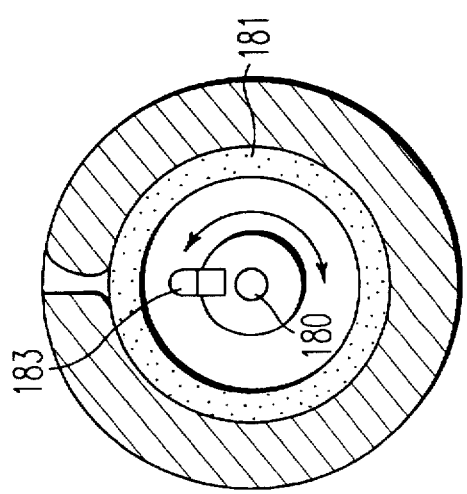

FIG. 18 is a plan view illustrating the construction of a noncontacting signal transfer apparatus of the fifth embodiment of the present invention, (A) showing the arrangement for transfer of a signal from the rotatable unit to the static unit, and (B) showing the arrangement for transfer of a signal from the static unit to the rotatable unit.

The present embodiment employs a luminescent surface (surface electric-to-light conversion element) 181 having an annular surface disposed between two concentric circles, this luminescent surface 181 being arranged coaxially with the rotation axis 180, i.e., being arranged so that a straight line perpendicular to these concentric circles that passes through the center of the concentric circles coincides with the axis of rotation. As a result, an electric signal applied to the luminescent surface 181 is converted to a light signal having rotation symmetry relative to the axis of rotation. In the two cases shown in FIG. 18(A) and (B), the luminescent surface 181 is arranged on the transmission side and the light-receiving element (photoelectric conversion element) 183 is arranged on the reception side. A signal transmitted from the transmission side is converted by the light-receiving element 183 to an electric signal invariant with respect to rotation of the rotatable unit.

The construction of the apparatus of FIG. 18 is a developed form of the apparatus of FIG. 16 in which an optical fiber group is applied for guiding and branching. This construction is premised on availability of a surface optical element (in this case a luminescent surface) 181 having a characteristic of high-speed response. With this construction, the surface optical element itself has both the guiding and branching functions and therefore very easily provides the same effect as the apparatus of FIG. 16. In addition, a similar construction in which the surface optical element is a surface light-receiving element is of course also possible.

The foregoing has been explanations of the constructions of the optical systems and leaves unsolved the problem of how, in addition to these constructions, power is to be supplied to a high-speed multiple-rotating body. In other words, it is necessary to supply power for driving the light-emitting elements and light-receiving elements of the rotatable unit, but because the above-described signal transfer is based on the premise that signal transfer is performed without using any contact point, it is not possible to supply power by means of a contact point such as by means of a conventional slip ring.

Figure 19:
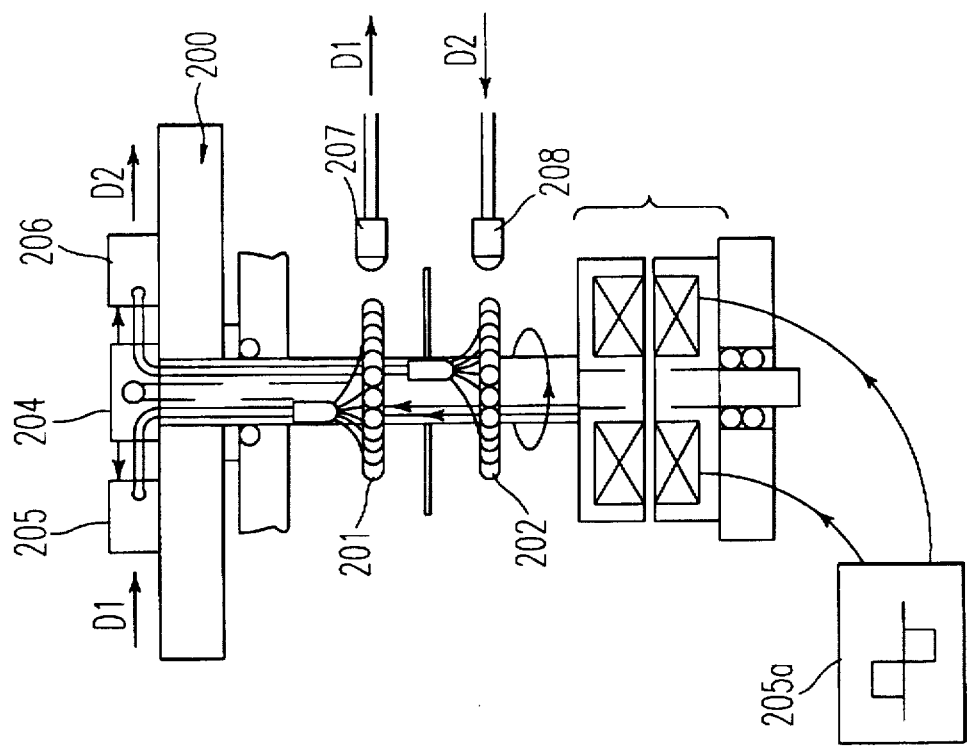
FIG. 19 is a view showing the construction of a noncontacting signal transmission system of the sixth embodiment of the present invention.

FIG. 19 shows the construction of a non-contacting signal transmission system according to a sixth embodiment of the present invention. The transmission system of the present embodiment is made up of, in addition to a two-channel noncontacting signal transfer apparatus, the pot-core type power transfer apparatus of FIG. 14 and its peripheral apparatus. The two-channel signal transfer apparatus are the devices of the third embodiment (FIG. 16) and the fourth embodiment (FIG. 17). To the rotating body 200 are fixed a light-emitting unit comprising a light-emitting element and a group of optical fibers (electric-to-light converting unit) 201, and a light-receiving unit comprising a light-receiving element and a group of optical fibers (photoelectric converting unit) 202. The electric power to be supplied to the light-emitting unit 202 and the light-receiving unit 202 is sent to the light-emitting element drive circuit 205 and light-receiving element drive circuit 206 by way of the pot-core power transfer apparatus 203, rectification-smoothing circuit 204 and the high-frequency inverter 205a. Drive circuit 205 drives the light-emitting unit 201 in response to data D1 provided on the rotating body, causing an optical signal to be generated. The light-receiving element 207 provided on the static part converts the optical signal to a electrical signal D1. Conversely, data D2 of the static part is converted to an optical signal by the light-emitting element 208, and this optical signal is converted to an electrical signal by the light-receiving unit 202 and outputted from drive circuit 206.

FIG. 20 shows a view of one example of the arrangement of the light-emitting element and light-receiving element of the noncontacting signal transfer apparatus according to the seventh embodiment of the present invention, (A) showing an arrangement for a case in which an electrical signal is transferred from a rotating table 210 to the static part, and (B) showing an arrangement for a case in which an electrical signal is transferred from the static part to the rotating table 210. In either case, a group of electric-to-light conversion elements for converting electrical signals to optical signals is fixed on the transmission side, and arranged in rotation symmetry relative to the axis of rotation, and a photoelectric conversion element for converting optical signals to electrical signals is fixed on the reception side.

Figure 20A:
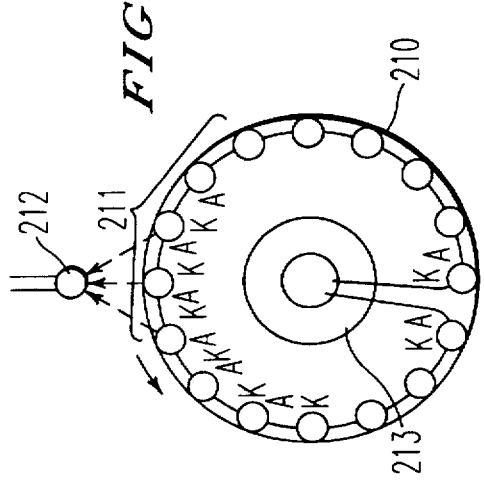
FIG. 20 is a view showing the arrangement of light-emitting elements and light-receiving elements of a noncontacting signal transfer apparatus of the seventh embodiment of the present invention.
Figure 20B:
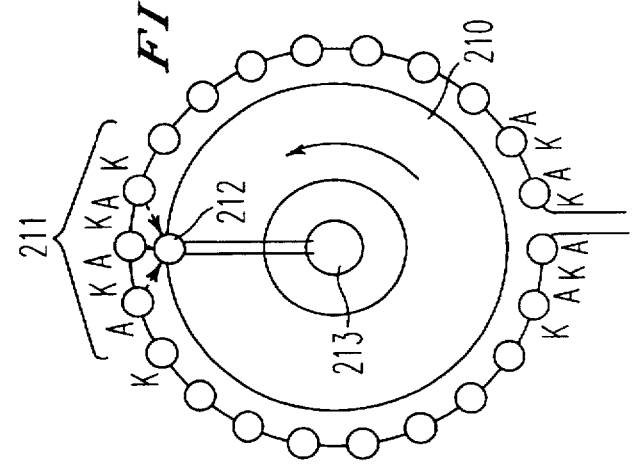

Generally, high-speed real-time transmission is necessary for command signals (position, speed, torque commands) and feedback signals (for example, pulse signals generated by a rotary encoder) for servomotor control. For this reason, transmission is performed by a signal transfer apparatus through optical coupling using an electric-to-light conversion element such as a laser or high-speed LED as the light-emitting element and a photoelectric conversion element such as a high-speed response photodiode and phototransistor as the light-receiving element. This apparatus is constructed so that rotation neither interrupts signal transfer nor causes changes in phase or amplitude, i.e., such that it has no transmission directivity depending on rotation position. In the embodiment shown in FIG. 20A, 16 LEDs are serially connected and arranged at equal intervals in a circumferential direction within a plane perpendicular to the axis of rotation, and in FIG. 20B, 22 serially connected LEDs 211 are arranged. Both ends of the serially connected LEDs is connected to the signal source of the digital signal to be transmitted. As the photoelectric conversion element 212, a photodiode is arranged in substantially the same plane as and at a slight distance radially from the LEDs. In FIG. 20, optical signals emitted by three LEDs are received by the photodiode 212. Elements having only slight dispersion in response characteristic are used for each element making up the electric-to-light conversion element group 211. In the figure, K and A are cathodes and anodes, respectively. The wiring of the rotating body is effected through a hollow portion 213 of the rotating shaft.

The third to seventh embodiments described above are optically coupled signal transfer apparatus in which signal transfer between the rotating body and static part is performed by means of light, but it is also possible to transfer a signal without direct electric contact through electromagnetic induction using a split-type high-frequency transformer of a similar construction as for the first and second embodiments as well as for the previously described pot-core power transfer. In this case, the split-type high-frequency transformer can be of low power but constructed so as to have a frequency characteristic corresponding to the wave form of the signal to be transferred. In the following description, a noncontacting transfer apparatus is referred to as a coupler, a noncontacting signal transfer apparatus that uses light is referred to as an optical coupler, and a noncontacting signal transfer apparatus that uses electromagnetic induction is referred to as an electromagnetic induction communication coupler (EIC coupler).

By using the signal couplers of the present invention, a signal transmission system having absolutely no direct contact but having high reliability can be constructed at low cost, and a method can be realized enabling information transfer between parts that make multiple relative rotations. Beginning with the feedback of tip information from high-speed multiple-rotation spindle or the transmission of command information to a shaft tip in an apparatus such as a vehicle or machine tool, this method is capable of application for a wide variety of uses requiring signal transfer between a rotating body and a static part, and from the viewpoints of stability and reliability, is an effective means that supersedes the slip ring method of the prior art, allowing contribution to automatization of manufacturing.

Figure 21:
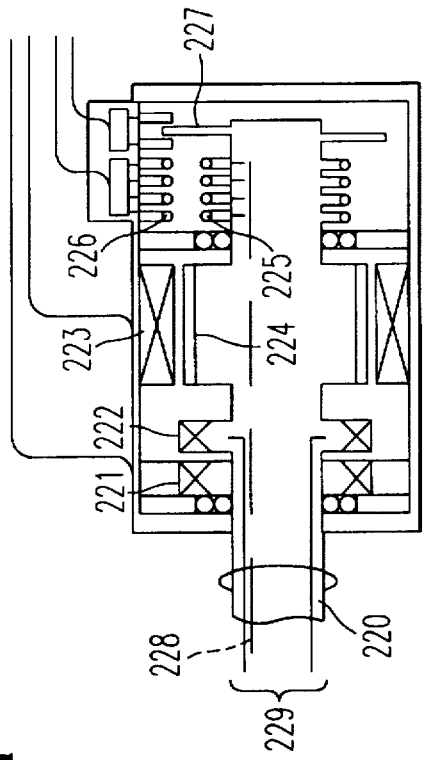
FIG. 21 is a view showing the construction of a rotary apparatus of the eighth embodiment of the present invention.
Figure 22B:
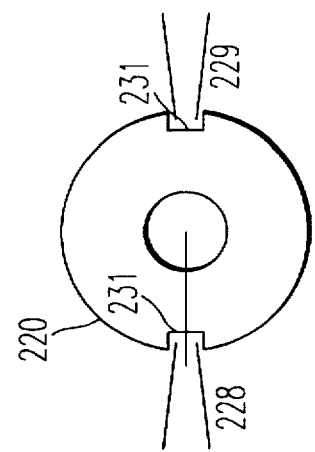
FIG. 22 is a sectional view showing wiring within a groove and a hollow portion of the rotating shaft.
Figure 22A:
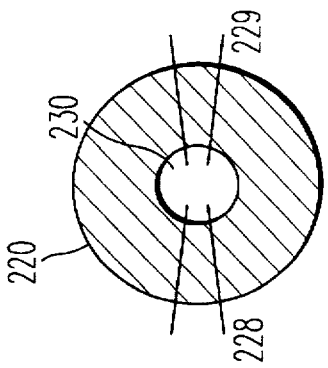

FIG. 21 shows the construction of an eighth embodiment of the present invention, which is an example incorporating a power coupler and a signal coupler within the case of a main shaft servomotor (or more widely, electric motors in general). FIG. 22 is a figure showing the ways of lead-out of the signal lead-out and the power lead-out from the end of the shaft, FIGS. 22A and 22B showing lead-out through a hollow hole and lead-out through a groove, respectively.

In the same figure, within the case of the motor made up of a stator 223 and rotor 224, a primary core 221 which is a high-frequency electromagnetic induction core is arranged near the bearing on the static side, and a secondary core 222 is provided on the rotation shaft 220 opposing the primary core across a gap, and the primary and secondary cores form the previously described split-type high-frequency transformer. The coil of the primary core 221, similarly to the stator 223 of the torque (motive power) generator part (TGP), is excited through the power line, and the coil output of the secondary core, by way of the lead-out 229 that passes through a groove 231 in the rotation shaft 220 or a hollow portion hole 230, is led out to the tip of the rotation shaft (refer to FIG. 22). In the opposite side of the load with respect to the power transfer part (PTP) and torque generator part (taken together as the power transmission section), an information transfer section (ITS) is arranged through the bearings. Parts 225, 226 make up either optical or high-frequency electromagnetic induction communication couplers for signal transfer, one side being provided on the static side, the other being provided on the rotating shaft side, either side being the transmission side or the reception side as the case demands. The signal communication of the electric load provided at the shaft tip are achieved by the signal lead-out 228 that passes though a groove 231 in the rotating shaft or a hollow portion 230 (See FIG. 22). In FIG. 21, signal couplers 225, 226 are provided in a plurality of pairs, but in this case, each of the pairs must be shielded in order that they not be influenced by leakage of optical signals or electromagnetic induction signals from other pairs. Such shielding is not important, however, in a case in which peak wavelengths in the response spectrum of a plurality of optical couplers used differ greatly for each coupler. The power source of a sensor (for example, an encoder for position detection) 227 for a motor of the prior art that is built into the motor may also be used for the power supply of the above-described signal coupler, and in addition, the signal processing such as wave-form shaping of the coupler output may also be carried out in the signal processer for the sensor of the prior art.

Figure 23:
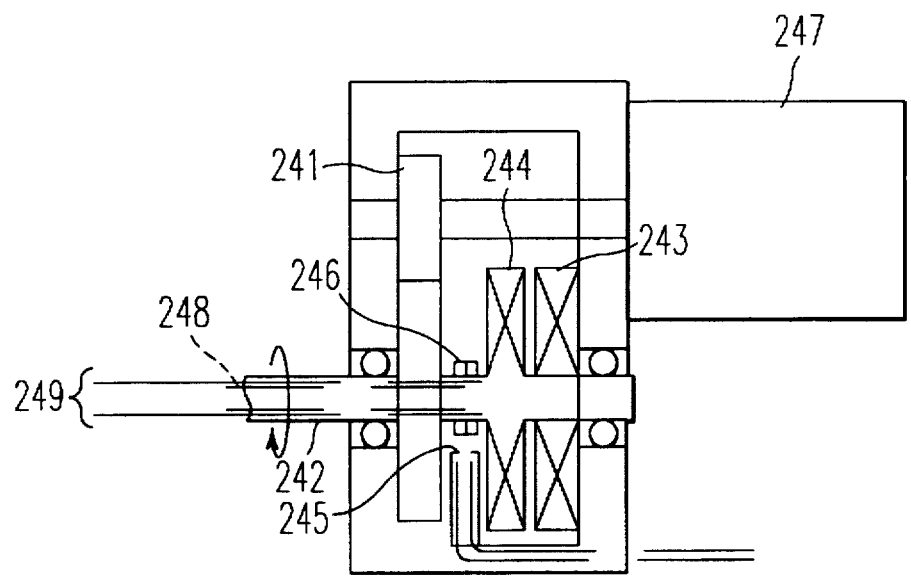
FIG. 23 is a view showing the construction of a rotary apparatus of the ninth embodiment of the present invention.
Figure 24:
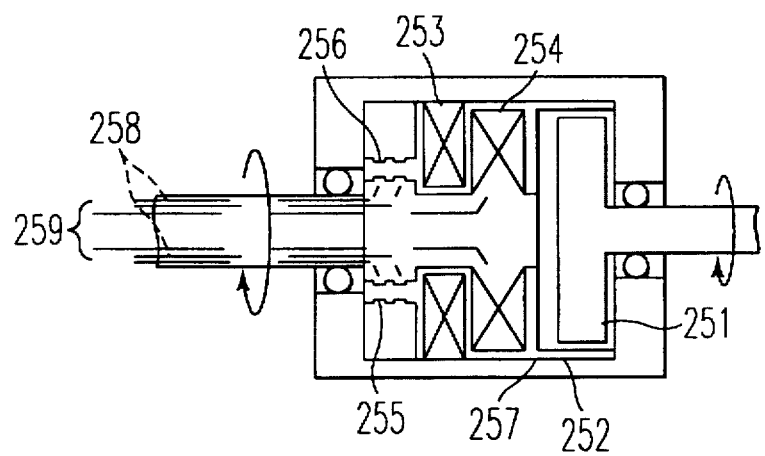
FIG. 24 is a view showing the construction of a rotary apparatus of the tenth embodiment of the present invention.

FIGS. 23 and 24 show ninth and tenth embodiments according to a similar concept in which a power transfer part and signal transfer part are incorporated within the case of a reduction arrangement. FIG. 23 showing a case in which the input shaft and output shaft are not coaxial, and FIG. 24 showing a case in which these shafts are arranged coaxially. Regarding FIG. 23, the rotation of motor 247 is reduced and transferred to output shaft 242 by way of gear train 241 provided within the casing. The output shaft 242 is supported at both ends by the bearings on both sides of the casing of the reduction arrangement, and between the bearings is attached the secondary core 244 of the split-type high-frequency transformer and the receiving section 246 of the signal coupler, the lead-outs 248, 249 being led to the electric load provided at the output shaft end by way of a groove or a hollow portion in the output shaft 242. On the inner face of the case, the primary core 243 of the split-type high-frequency transformer and the transmission section 245 of the signal coupler are provided in positions opposing across a gap the secondary core 244 and receiving section 246, respectively, on the output shaft side. Regarding FIG. 24, the only points of difference from FIG. 23 are that the input and output shafts are arranged coaxially and that harmonic gear (precession gear) 252 are used for the reduction stage. In either case, the operation is similar to the case in which the components are incorporated into a motor: the power transfer part and the signal transfer part are attached to the output shaft, and the wirings 258, 259 for these parts are led out to the electric load provided at the shaft end through a groove or a hollow portion in the output shaft (See FIG. 22). Moreover, the order of positions on the shaft of the power transfer part and the signal transfer part may be interchanged.

Figure 25:
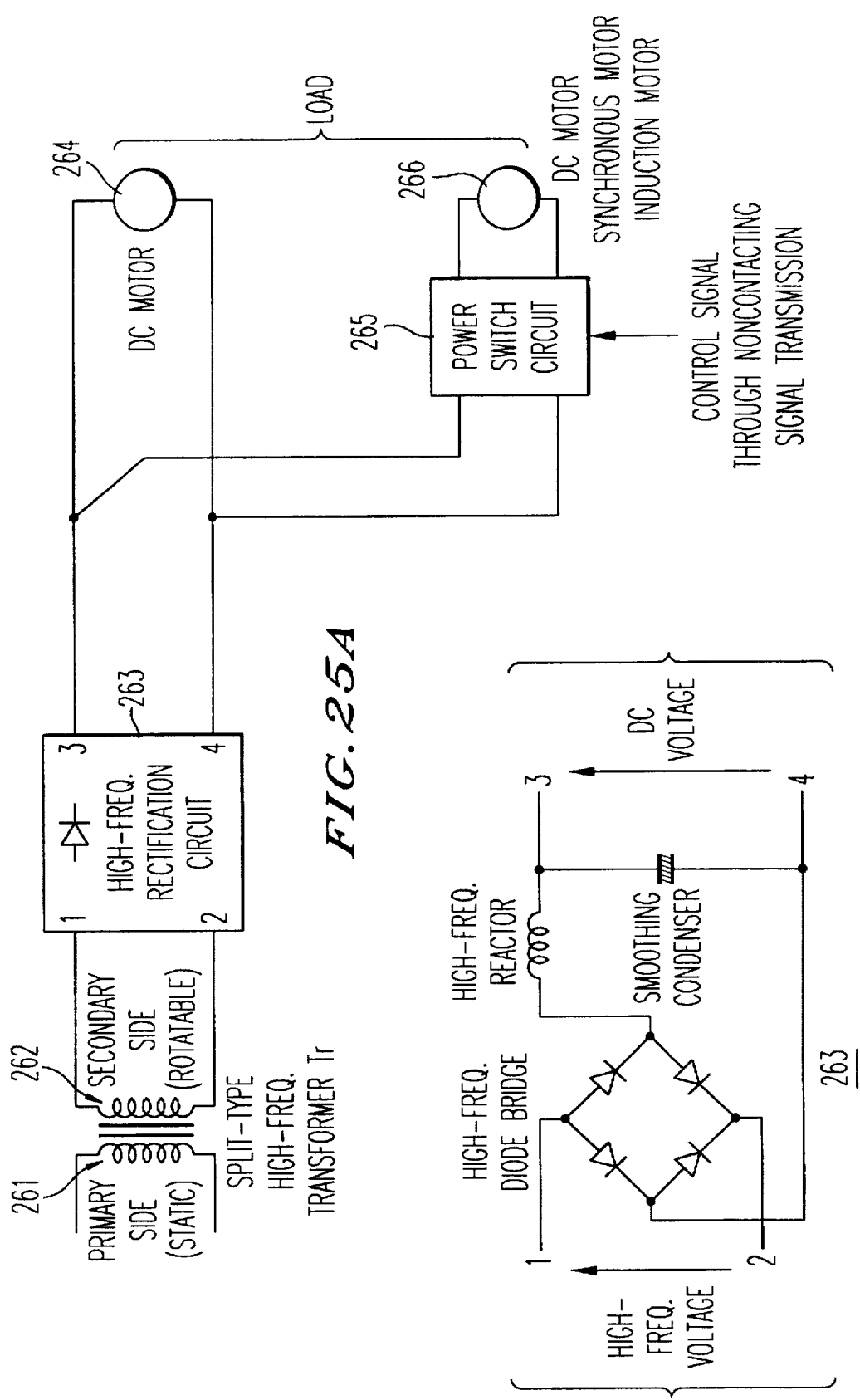
FIG. 25 is an electrical circuit diagram illustrating a manner of providing electric power to an ordinary motor load according to the eleventh embodiment of the present invention.

Next will be explained, referring to FIG. 25, the method of transmitting power and signals to an electric load installed at a rotating output shaft tip to drive the load using a motor or reduction arrangement unit constructed in such a manner that allows transmission of the power and signals to the output shaft tip, as described above.

In a case in which the electrical load is a light-generating or heat-generating load, because either case is of an effective value load, the high-frequency voltage received at the shaft end lead-out may be applied as is to the load. The shaft end lead-out voltage may also be applied as is when driving a high-frequency motor. However, in the case of general motor loads, in order to drive in a DC or low frequency range, a high-frequency rectification circuit 263 (made up of a diode and an LC filter) must be mounted ahead of the shaft tip to convert to DC or low frequency voltage (embodiment 11). This DC voltage is then used to (1) voltage-control the DC motor 264, and (2) control the load 266 through a bridge 265 of power switch elements such as transistors.

In this way, any of DC motor, a synchronous motor, or an induction motor can be controlled at a position beyond the rotating shaft end. It is not necessary, however, to mount all components of a servo-controller of the prior art at the shaft end. This is because, as described above, transmission of a signal (for input and output) can be effected between the static side of a motor or reduction arrangement and the output shaft end by means of noncontacting transfer, and if, for example, the position information and speed information obtained at a sensor mounted on a motor attached beyond the shaft end is returned to the static side by means of this transfer channel and torque command information is sent from the static side to the shaft end side by means of another signal transfer channel, position and speed control for the motor control can be carried out at the static part and torque control can be carried out at the position beyond the shaft end. In this way, a method can be employed that enables reduction of the weight and physical size of controller parts attached at positions beyond the end of a shaft end.

Figure 26:
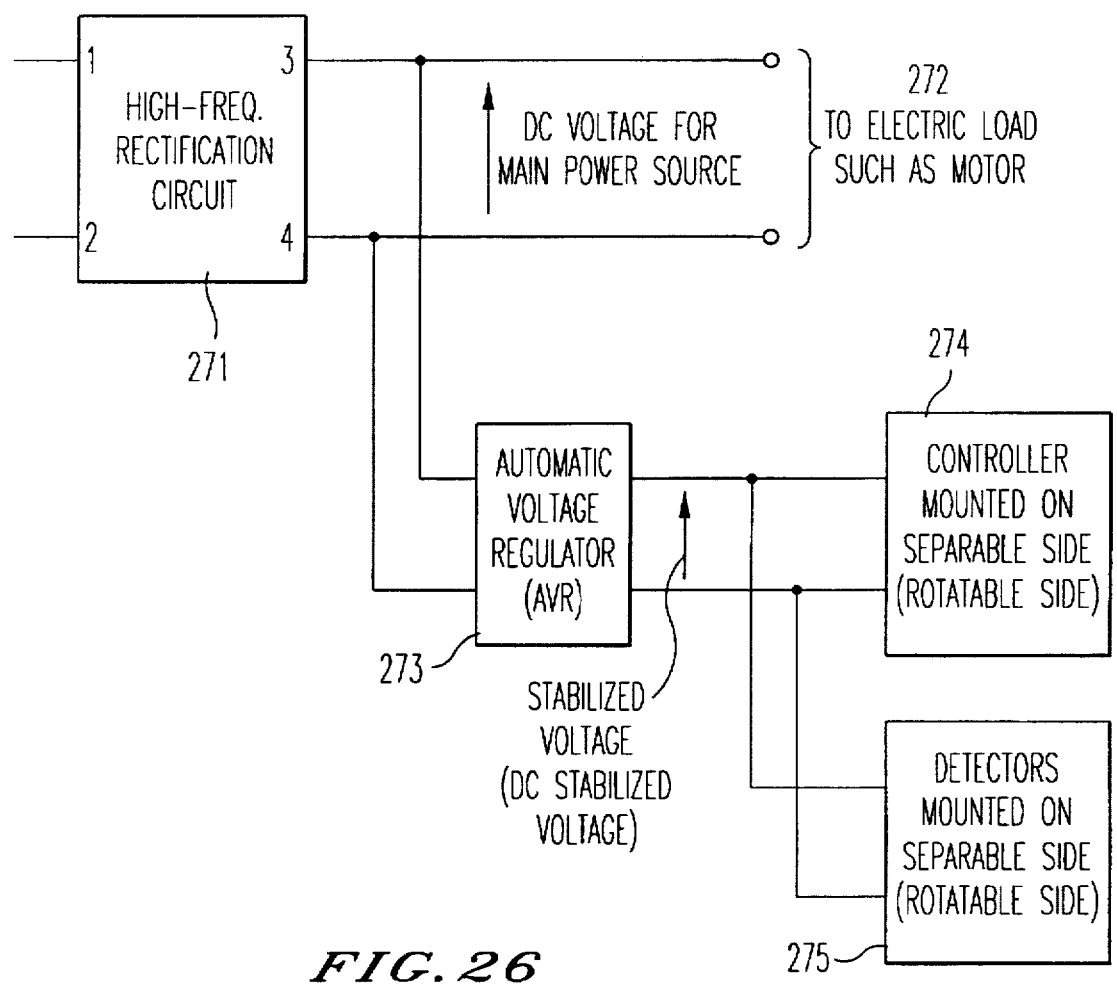
FIG. 26 is an electrical circuit diagram showing a manner of providing electric power to the controller and detector disposed ahead of a shaft tip according to the twelfth embodiment of the present invention.

The power source for a controller part or detector arranged beyond the shaft end is supplied with the transmitted power after the above-described rectification following stabilization by passing through an automatic voltage regulator (AVR) 273 (the twelfth embodiment), as shown in FIG. 26.

The above description focuses on a case in which work is performed by mounting an electric load beyond the shaft end and using transmitted power. The present invention, however, is also effective in an application limited to applying a low electric power (or in some cases, applying no electric power) to the device disposed beyond the shaft end to operate a sensor, and transmitting its signal to the static part. In this case, the previously described power transfer part can be extremely small (or nonexistent).

Further, although the high-frequency induction power transfer of FIG. 21, FIG. 23 and FIG. 24 is carried out in single phase, the power transfer may also effectively be made in polyphase for one or a combination of the following reasons: 1) to increase transmitted power, 2) direct control of a high-frequency motor or stepping motor, 3) to reduce the burden on a rectification circuit.

The above-described power and signal transfer elements can be integrated by incorporation within a motor or reduction arrangement, thereby 1) suppressing the generation of output shaft rotational vibration by incorporating the rotating part of the element (particularly the heavy power transfer part) between the bearings;
2) facilitating control of the gap in the noncontacting power transfer part and control of the ambience of the gap (preventing fouling by dust and the like);
3) in particular for a signal transfer part using optical coupling, controlling the ambience in the same manner as for an optical encoder of the prior art; and
4) rationalizing the structure by, when incorporating into a motor, combining the motor torque generator part of the prior art with the above-described power transfer part en bloc as the power transmitter section, and controlling the ambience by combining the sensors such as optical encoders in the prior art motor and the above-described signal transfer part en bloc.

The eighth to twelfth embodiments include all applications, not only to the field of precision motor control such as a knucle in each axis of the previously described robot arms or machine tools (particularly for the drive at the tip of a main shaft), but also to the wide range of fields that require power supply and information transfer through a rotating part and that have hitherto required wiring and slip rings giving rise to the problems of fatigue and wear.

The present invention enables power transfer and signal transfer through a rotating part which were not feasible in the prior art, and moreover, by incorporating the noncontacting transfer part into a motor or reduction arrangement (particularly when incorporating with a motor), treating the torque generator part and the power transfer part together as a power transmission section, and treating the sensors and signal transfer part together as the information transmission section, the invention both allows stabilization of the structure of the rotating part and enables the control of the gap and ambience by isolating these transmission sections from the outside ambience.

Further, passing wiring for power transmission and signal transmission through a groove or hollow portion of the output shaft allows disposition of wiring that does not affect the transmission of motive power, and in addition, the grounding of the output shaft through the bearings allows a potential shielding effect for the wiring, and the influence of noise released to the outside or received from the outside can be dramatically reduced.

Figure 4:
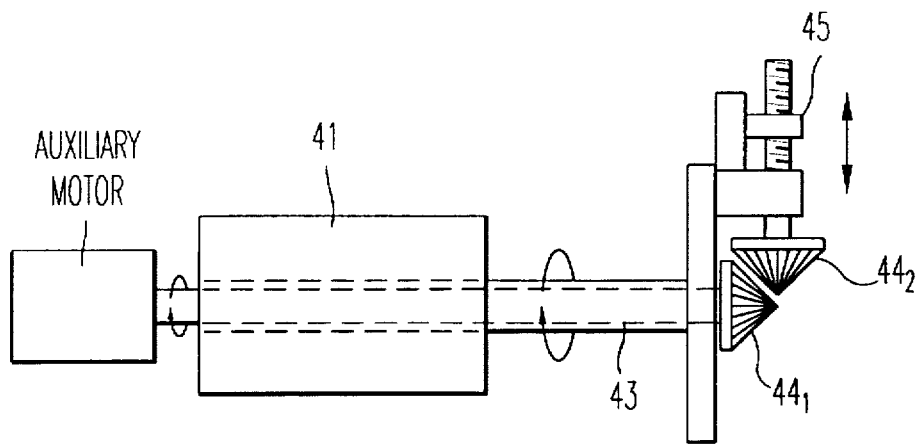
FIG. 4 is a view showing a mechanical power transmission mechanism using a coaxial shaft.

Further, because sensor information can be obtained from the shaft end by way of the signal transfer part, by using the present invention combined with the mechanical power transmission (for example, in FIG. 4) of the prior art, the present invention can be used to control mechanical power transmission.

By using a combination of a plurality of motors or reduction arrangement in which are incorporated power and signal transfer structures constructed in this manner, a mechanism (machine tool, robot) that enables easy attachment, detachment and exchange can be easily constructed without wiring.

A main shaft end information transmitter according to the thirteenth embodiment of the present invention will next be described. In this embodiment, the sensing and transmission of main shaft tip information is achieved by combining noncontacting power transfer using high-frequency electromagnetic induction with information transfer using the EIC coupler or optical coupler.

Figure 27:
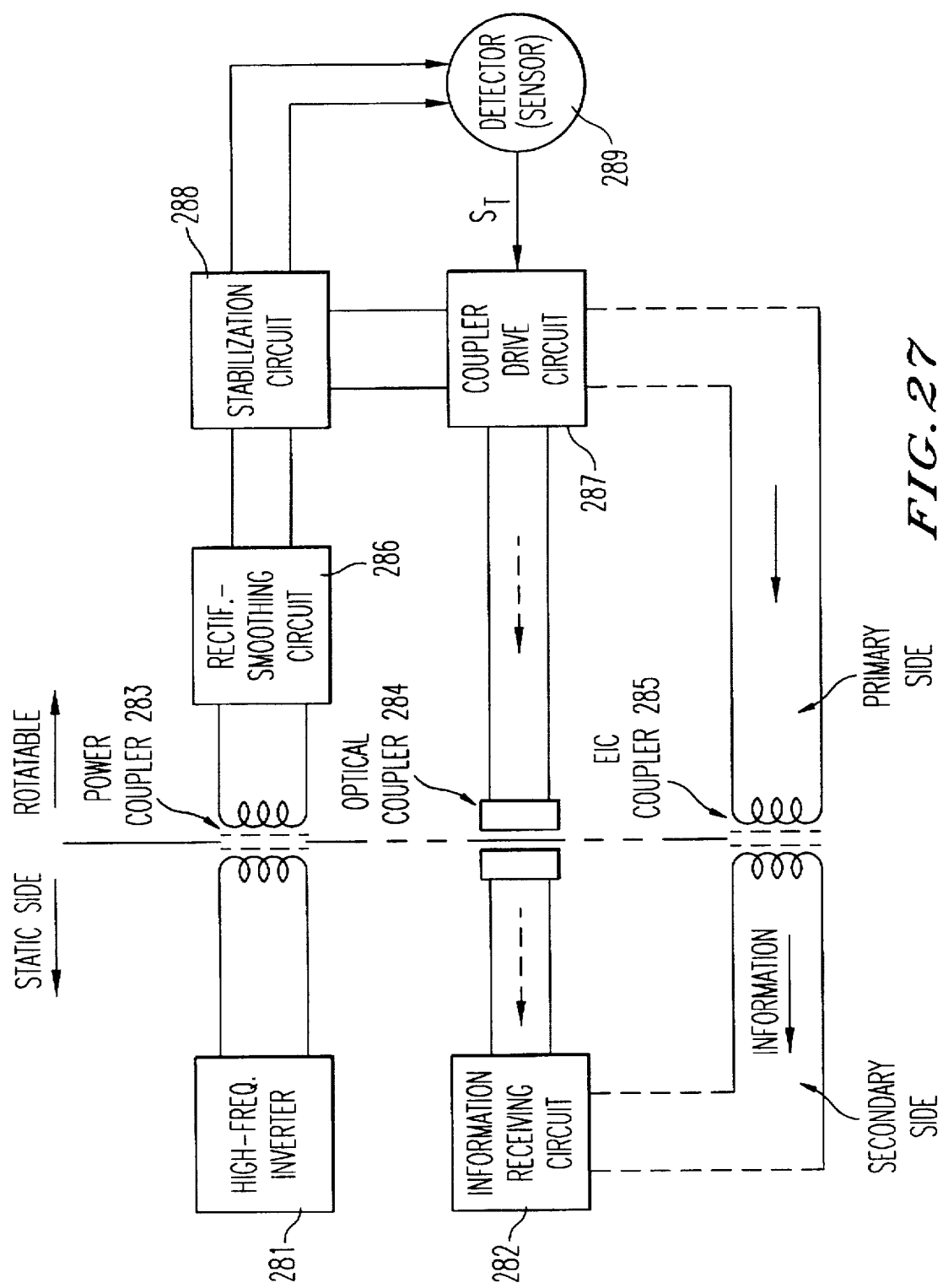
FIG. 27 is a block diagram showing a construction of a main-shaft tip information transmission system according to the thirteenth embodiment of the present invention.

FIG. 27 shows the fundamental structure of noncontacting power and information transmission according to the present embodiment. As shown in the figure, a power coupler 283 of split-type high-frequency transformer Tr structure is either built into the main shaft unit or attached to the main shaft tip. On the left side of the figure are placed a high-frequency inverter 281 and an information receiving circuit 282. The power outputted from the high-frequency inverter 281 is transmitted to the rotatable unit by way of the power coupler 283, and after being rectified and stabilized by the rectification-smoothing circuit 286 and the stabilizing circuit 288, is supplied as power source to the sensor 289. The coupler drive circuit 287 is supplied with power from the output of the stabilization circuit 288 and drives the optical coupler 284 and electromagnetic induction communication coupler (EIC coupler) 285 in response to sensor information $S_T$ fed from the detecting end (sensor) 289. The information receiving circuit 282 receives and processes the outputs of the optical coupler 284 and the EIC coupler 285 (on the static side). FIG. 28 shows a high-frequency transformer Tr construction incorporated within a main shaft unit in which power transfer is effected by means of electromagnetic induction generated between high-frequency magnetic substances of pot-core type placed face to face. In this case, the secondary side pot-core 292 is fixed coaxially to the main shaft 290, and the main shaft 290 is driven by a main shaft motor 297 by way of a timing belt 296. The primary side pot-core 291 is fixed to the main shaft motor 297. When the primary coil 293 is excited, induced power caused in the secondary coil 294 by way of the primary and secondary pot-cores is sent to the tip of the tool 298 via the secondary coil lead 295.

Figure 29A:
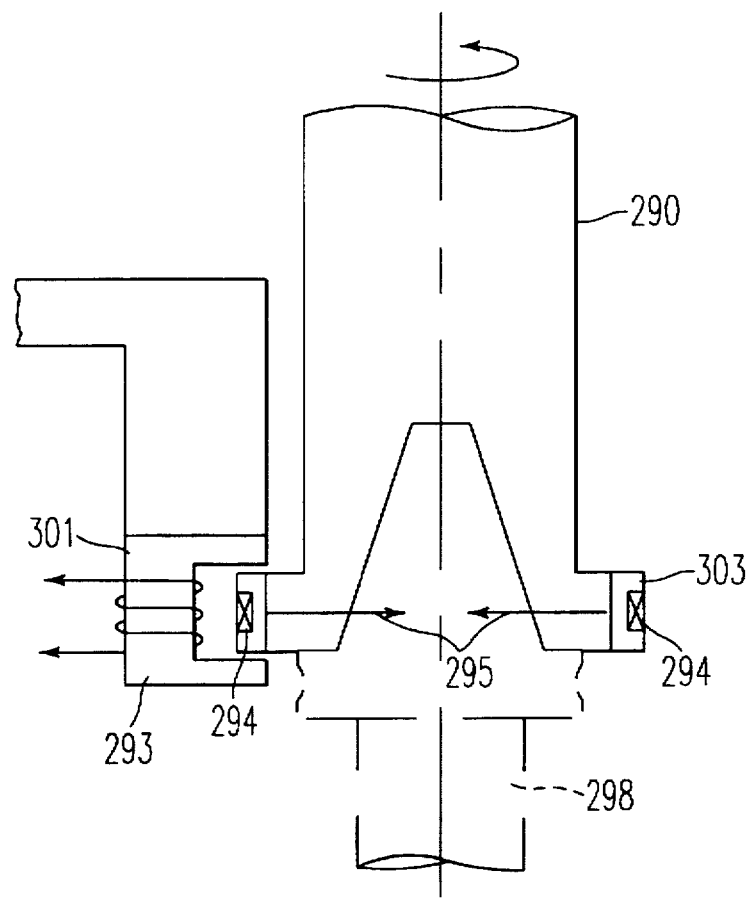
FIG. 29 is a view showing the high-frequency transformer structure attached ahead of the tip of a main shaft.
Figure 29B:
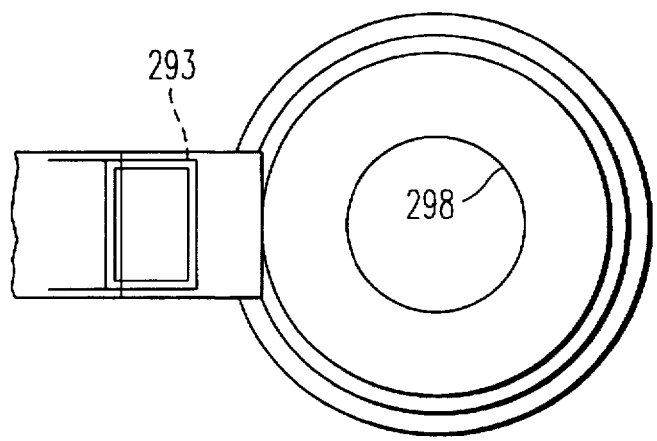

FIG. 29 shows a case in which a high-frequency transformer Tr construction of a power coupler is attached to a main shaft tip. FIG. 29A being a schematic view showing the attached position, and FIG. 29B being a plan view showing the arrangement of the power coupler (the noncontacting power transfer apparatus) as viewed from the tool side. The power coupler is of the same form as the first embodiment, with the U-shaped core 301 fixed to the static part and the core ring 303 of a high-frequency magnetic substance fixed around the circumferential edge of the tip of the main shaft 209 coaxially with the main shaft 290 forming a magnetic circuit together with U-shaped core 301.

In either construction, the primary coil 293 of Tr is fixed on the static side, is excited at a high frequency, and generates a high-frequency voltage corresponding to a turn ratio on the secondary side. The secondary side, on which is arranged the secondary coil, is attached to the main shaft side and consequently rotates at a speed corresponding to the main shaft rotation speed relative to the primary side. Either of the cases shown in FIG. 28 and FIG. 29 uses a construction such that the gap width between the primary and secondary cores does not vary over one rotation of the main shaft. Here, if high-frequency excitation is effected at a high frequency equal to or greater than 10 kHz, the frequency of the excitation is sufficiently high compared to the maximum rotation frequency of the main shaft reduced to an electrical angle, whereby even should the main shaft rotate at high speed, no substantial disturbance will occur in the magnetic field distribution, and stable power transmission can be performed so far as no change is caused in the gap between the high-frequency magnetic cores of the primary and secondary coils.

Figure 30:
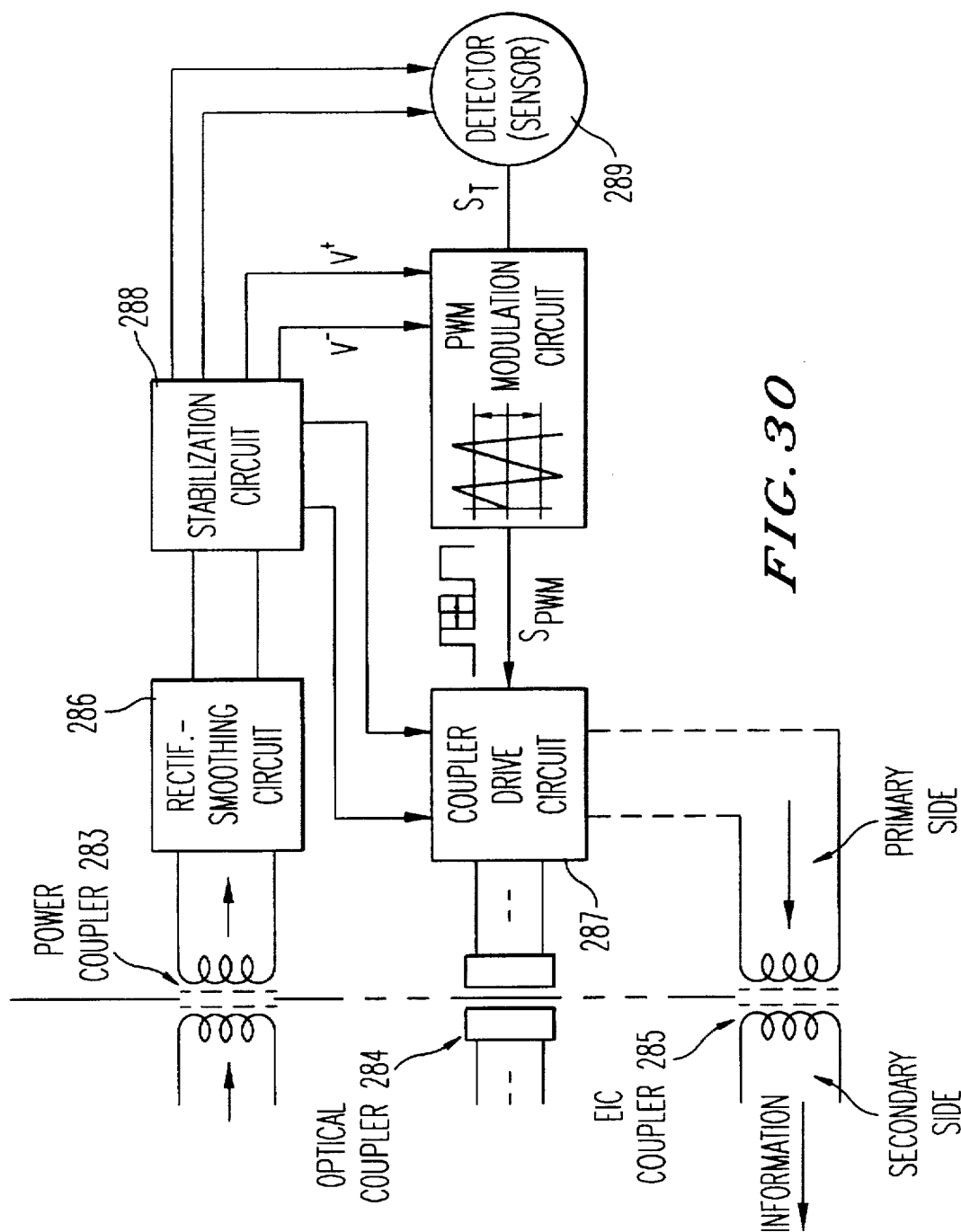
FIG. 30 is a view illustrating a PWM feedback system for information created on a main shaft tip.

Because it is necessary that the power source for the sensor provides sufficiently stable voltage, the DC voltage obtained by rectification and smoothing of the high-frequency voltage produced by secondary coil induction is supplied to the sensor after stabilized through a stabilizing circuit, as shown in FIG. 27. With this power source, the sensor detects the physical values at the rotating main shaft tip and generates sensor information. When the sensor information (signal) is a digital signal of a pulse train, it is amplified and supplied directly to the signal transfer circuit described below. As shown in FIG. 30, when the sensor information is of an analog signal, the analog signal is also converted to a pulse train signal by pulse width modulation (PWM) that modulates a saw-tooth wave carrier signal produced from the voltage to be sent to the main shaft tip by way of the high-speed rotating part (in power coupler), i.e., the output voltage of the stabilizing circuit 288. In particular, when a detected analog signal varies with positive and negative polarities, the saw-tooth wave must also be converted to be bipolar. In such a case, in order to simplify the power circuit on the main shaft tip, a combination of the secondary coil and rectification circuit as shown in FIG. 31 is used. The device shown in FIG. 30 is the device in which a PWM modulation circuit 311 is added to the device of FIG. 27, and $V^+$ and $V^-$ are voltages for generating saw-tooth waves that change between positive and negative values (Refer to FIG. 31). PWM modulation circuit 311 modulates the saw-tooth carrier signal by the analog sensor information $S_T$ and generates a PWM modulated wave $S_{PWM}$. FIG. 31 is a block diagram of the rectification-stabilization circuit (corresponding to the rectification-smoothing circuit 286 and the stabilizing circuit 288 of FIG. 30) for generating the positive and negative voltage necessary for generating a saw-tooth wave that changes with positive and negative polarities.

In this circuit, the secondary coil of the split-type high-frequency transformer 321 that makes up the power coupler has an intermediate tap, and this intermediate tap is connected to the ground potential of the rotatable unit. The output of the split-type high-frequency transformer 321, after being rectified and smoothed by diodes $D_1$, $D_2$ and capacitors $C_1$, $C_2$, is stabilized by voltage stabilizing regulators AVR1, AVR2, AVR3, and outputted by way of output capacitors $C_3$, $C_4$, $C_5$. Voltage $V_1$ is used as the power source for sensor 289, and $V^+$, $V^-$ are inputted to PWM modulation circuit 311 as described above.

A sensor signal that has been converted to a pulse signal in this way is transferred without direct contact to the static side by high-frequency induction transfer or light pulse transfer beyond the high-speed rotating part by way of the central or exterior route of the above-described transformer Tr for power transmission. On the static side, light or high-frequency pulses are received and undergo digital-to-analog conversion as necessary. In particular, a PWM modulated signal can be demodulated to an analog signal by merely passing through a low-pass filter on the static side.

When the sensor signals are generated in a plurality of channels, information transmission paths for each of the channels can be structured in a coaxial arrangement as shown in FIG. 32 (this is an example using optical couplers) or by attaching a microcomputer to the secondary side, i.e., the main shaft tip, and sending data for the plurality of sensors by a single information transmission path in the form of serial data with designated channel numbers. FIG. 32 shows a three-channel optical coupler. FIG. 32A being a light-emitting part and FIG. 32B being a light-receiving part. The light-emitters 331, 332, 333 are coaxially arranged around the rotating axis 330 with an optical shield 335 arranged between each emitter. As light-emitters 331–333, any of the electric-to-light converters disclosed in the third, fifth, and seventh embodiments can be employed. The light-receiving elements 336, 337, 338 are arranged so as to confront each of light-emitters 331, 332, 333, respectively, when the rotating shaft 330 is fitted in the bearing 339.

The present embodiment enables the acquisition of information from the rotating main shaft or main shaft tip not possible by the prior art, thereby enabling the on-line monitoring of a state on the rotating main shaft as well as enabling closed loop control by feedback of the main shaft tip information in lieu of open loop control of the prior art.

Figure 33:
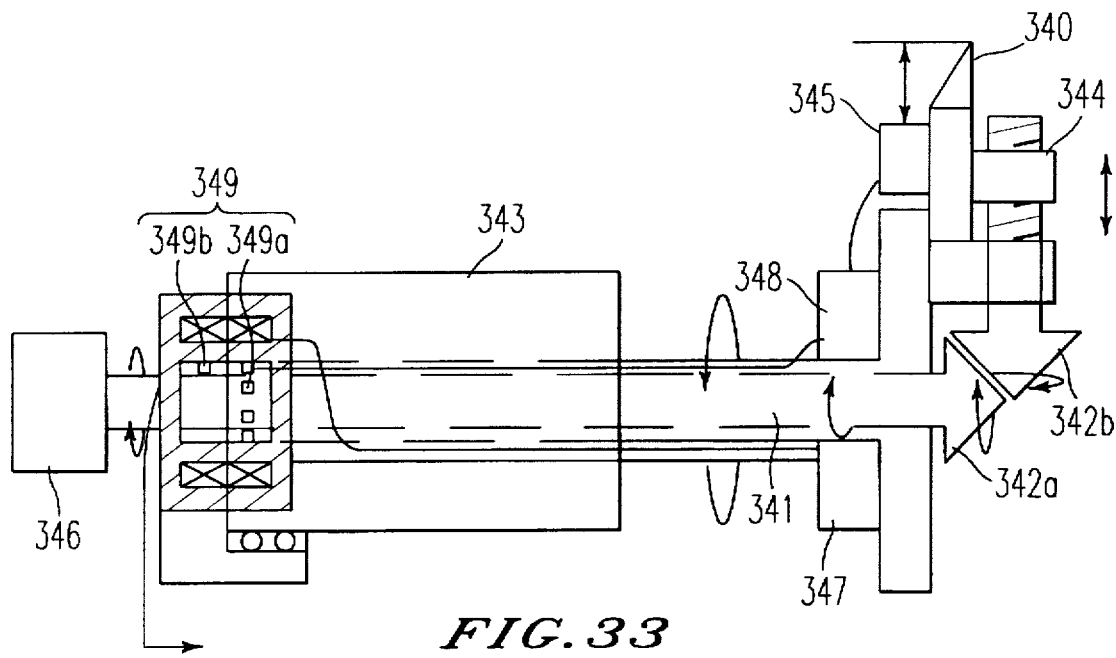
FIG. 33 is a view showing an application of the present invention to measurement of a tool tip size of an infeed tool.

FIG. 33 shows an example of remote measurement of a tool tip dimensions of an infeed tool 340 for variable-radius boring attached to a main shaft. As shown in the figure, a coaxial shaft 341 for motive power transfer arranged coaxially with the main shaft is passed through a hollow main shaft fixed within a main shaft unit 343 and delivers from a distance the motive power of a servomotor by way of a mechanism such as bevel gears 342a, 342b, thereby directly moving a tool tip in a tool post 344 and changing the boring radius. In this example, however, the tool tip dimensioning is carried out by open loop control because in this construction, the tool tip is mechanically moved by the servomotor of the motive power source by way of such a complicated structure. As a result, tool tip dimensioning requires the worker to stop the rotation of the main shaft for every process and check the dimension by measuring it with a scale. In contrast, by measuring tool tip dimensions with a linear scale 345 at a part ahead of the main shaft and feeding back the measured values to the static part using the present invention, measurement of a remote tool tip dimension can be achieved while rotating the shaft, and consequently, change of boring radius can be effected in process by closed loop control. As shown in FIG. 33, the power sources for the signal processing and communication circuit 348 and for the linear scale 345 are supplied by rectification-smoothing circuit 347 by way of a pot-core power coupler. The communication circuit 348 converts the output of the linear scale 345 to a pulse train and transmits it to the static part by way of the optical coupler 349 made up of light-emitting element 349a and light-receiving element 349b.

In the same way, use of the present invention also enables on-line monitoring during operation of tools required in 24-hour continuous processing in FMC (for example, prediction of tool breakage and confirmation of breakage based on acoustic emission information, tip temperature information and vibration information).

Figure 34:
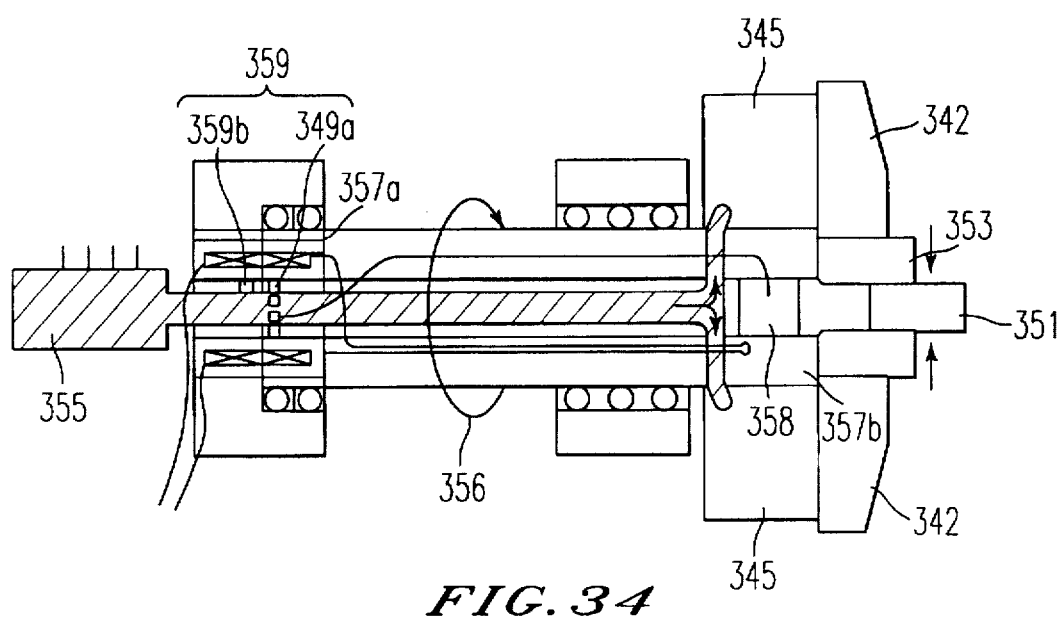
FIG. 34 is a view illustrating an application of the present invention to monitoring grasping power of chucking at a main shaft tip.

Further, the invention allows easy feedback of measured information of a position beyond a spindle head (for example, the gap between a tool and a workpiece), as well as of the more basic sequence signals such as limit switch signals of an ATC collect chuck. For example, in a chucking apparatus mounted at a spindle head tip that is driven by a hydraulic cylinder, because actual chucking pressure varies with the increase in rotation speed of the spindle, it is desirable to effect on-line control by feedback of chucking pressure. On-line monitoring of chucking pressure is desired even when actual control is not intended. In such a case, monitoring can be achieved as shown in FIG. 34, in which a pressure sensor (such as a device applying a piezoelectric element) 353 attached to a part where the workpiece 351 contacts the chuck 342 is used to detect variation in the grasping power exerted on the workpiece, and this information is sent to the static side by the data transmission method of the present. The hydraulic actuator 345 shown in the figure is driven by hydraulic pressure applied from a rotating cylinder 355 by way of rotating coupler 356. Power supply for the signal processing circuit 358 is effected by using rectification-smoothing circuit 357 to rectify and stabilize a high-frequency voltage transmitted from the static part by way of a pot-core power coupler 357a. The signal processing circuit 358 converts the output of pressure sensor 353 to a pulse train and transmits it to the static part by means of an optical coupler 359 made up of light emitting element 359a and light receiving element 359b.

The present embodiment is not limited to the above-described periphery of a machine tool main shaft, but can also be generally applied effectively to the measurement of physical values on a rotation shaft of an electric motor that has been beyond the capability of the prior art, and as a result, is useful in improving the capability of controlling motors, particularly servomotors. For example, direct detection of motor shaft vibration is essential for improving the control characteristics of servomotors. For such detection, a strain gauge is adhered to suitable points on a motor rotation shaft, the analog output voltage of the bridge circuit is amplified, the PWM conversion is effected, and the occurrence of shaft vibration can be detected on line in the form of stress of the shaft by way of the rotating part using the construction of the present embodiment. Measurement of rotor temperature necessary for vector control of an induction motor can also be achieved on line through the method of the present embodiment.

Figure 35:
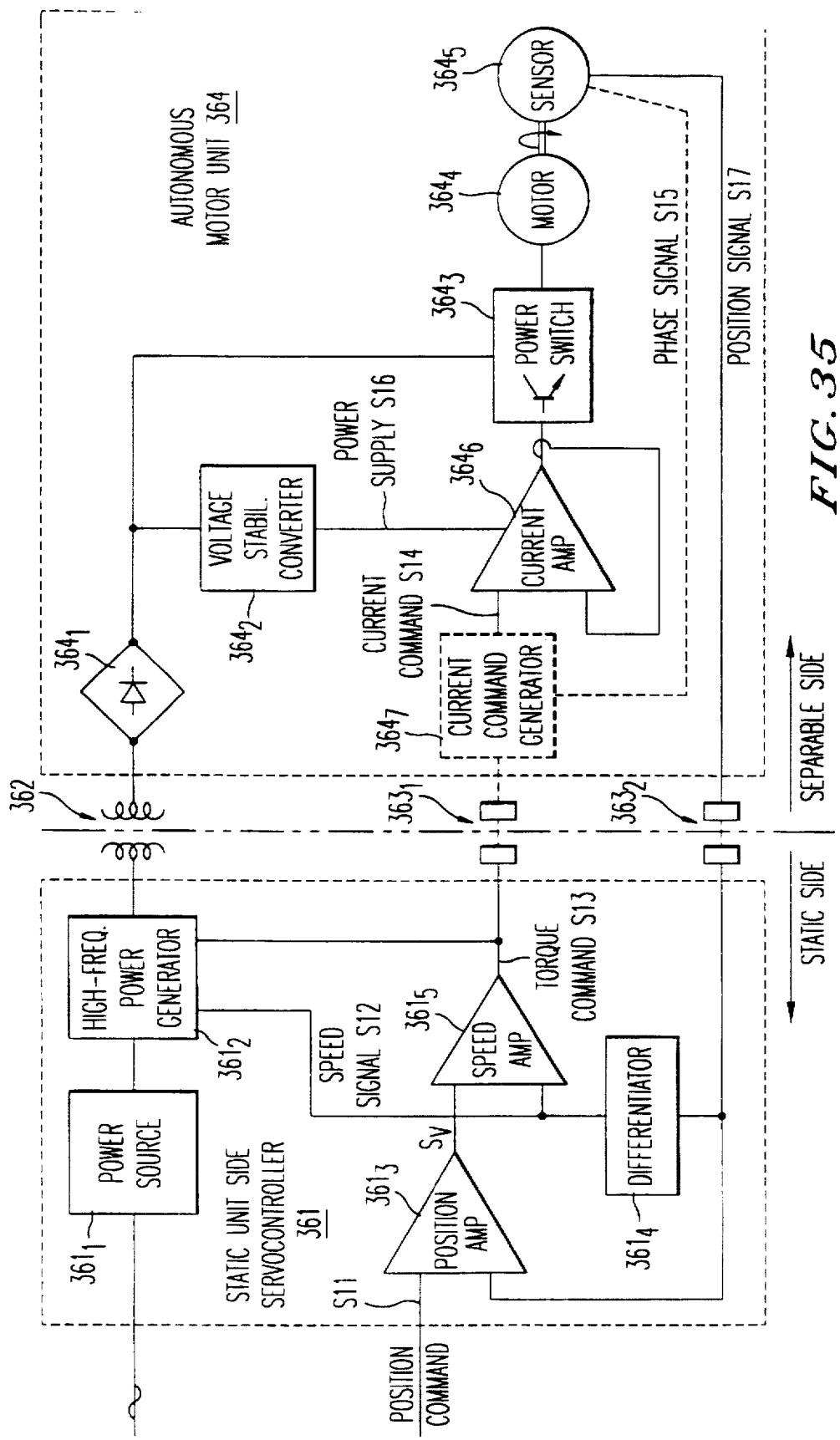
FIG. 35 is a block diagram showing an embodiment of the split-type control circuit of a servomotor of the present invention.

FIG. 35 is a block diagram showing a separate-type control system for a servomotor of the fourteenth embodiment of the present invention.

The present embodiment is composed of a static unit side servocontroller 361 constituting a static side, an autonomous motor unit 364 which is a separable mobile side and is a machine element for autonomous decentralization, and a split-type high-frequency transformer 362 and couplers $363_1$, $363_2$ that perform noncontacting power supply and signal transfer between these two sides.

The static unit side servocontroller 361 is made up of a power source $361_1$, high-frequency power generator $361_2$, position amplifier $361_3$, differentiator $361_4$, and speed amplifier $361_5$. The autonomous motor unit 364 is made up of a rectification circuit $364_1$, a voltage stabilizing converter $364_2$, a power switch $364_3$, a motor $364_4$, a sensor $364_5$, a current amplifier $364_6$, and a current command generator $364_7$.

In the present embodiment, the motor $364_4$ provided on the separable mobile side can be either a direct current motor or an alternating current motor, and should be understood as a torque generator.

The position signal S17 of the motor $364_4$ is converted to an optical pulse or an electromagnetic pulse and fed back to the static side by noncontacting transfer by way of the coupler $363_2$. The position amplifier $361_3$ of the static unit side servocontroller 361 generates a speed command $S_V$ from a position signal S17 and a position command S11 received from an upstream apparatus. Speed amplifier $361_5$ generates a torque command S13 from a speed signal S12 and speed command $S_V$. Speed signal S12 also controls the output of high-frequency power generator $361_2$. Torque command S13 is transmitted to the autonomous motor unit by noncontacting transfer by the coupler $363_1$.

The transmission of power for driving the motor $364_4$ is performed through high-frequency electromagnetic induction using the split-type high-frequency transformer 362. The output of the direct current power source $361_1$ is converted to high-frequency rectangular waves by high-frequency power generator $361_2$, supplied to the primary coil of the split-type high-frequency transformer 362, and the secondary output of the split-type high-frequency transformer 362 is supplied to the autonomous motor unit 364. This high-frequency power is rectified by the rectification circuit $364_1$ provided in the autonomous motor unit 364 and made up of a filter and bridged diode, following which it is supplied to voltage stabilizing converter $364_2$ and power switch $364_3$, and makes motor driving power after passing through power switch $364_3$. The voltage stabilizing converter $364_2$ stabilizes the supply voltage from the rectification circuit $364_1$, following which the power is supplied to the current amplifier $364_6$ as power source S16.

The information is transferred as pulses as described above in order that data will not vary due to variations in the gap of the high-frequency electromagnetic induction coupler, since the optical coupler or high-frequency electromagnetic induction communication coupler is integrated with the split-type high-frequency transformer 362 for power transmission as couplers $363_1$, $363_2$, and torque command S13 is transmitted through coupler $363_2$ after being converted to pulses by an analog-digital converter (not shown) by V-F conversion or PWM modulation.

In the autonomous motor unit 364, this command pulse is converted to an analog torque command S13 by a digital-analog converter (not shown). The current command generator $364_7$ produces a current command S14 from the torque command S13 and a phase signal S15 of the motor $364_4$ supplied from the sensor $364_5$, and outputs the current command S14 to the current amplifier $364_6$. If the motor is a direct current motor, the torque command S13 is used as current command S14 as is, and thus current command generator $364_7$ is unnecessary.

The proportional or proportional -plus-integral control current amplifier $364_6$ that controls the power supply for the motor $364_4$ performs amplification depending on the difference between current command S14 and the detected current value, performs PWM modulation, and outputs to the power switch $364_3$. This output serves as an input signal for the preceding-stage amplifier for base (or gate) drive of the power switch $364_3$ made up of a power transistor, MOSFET, or IGBT. The power switch $364_3$ converts the direct current main power supply fed from the above-described rectification circuit $364_1$ in response to the base drive signal fed from current amplifier $364_6$ and supplies PWM voltage to the motor $364_4$ such that the torque command S13 and the torque feedback (current feedback) coincide.

The embodiment as described above meets the trend during recent years towards miniaturization of power switches and integration with peripheral circuits, and provides a method of control in which only the part (current control circuit) of the control unit that is peculiar to a motor type and a power switch are mounted on a portion (for example, a pallet or a rotating body) that is removable separately together with the motor and these are treated together as a single unit that generates torque, and the servocontroller on the static side effects control independent of the motor type. As a result, of the controls necessary for controlling a motor such as position control, speed control, and current control, those components that perform control universal and unaffected by motor type, i.e., the position loop for position control and the speed loop for speed control, are separated from those components that are peculiar to a motor type, i.e., the current loop for current control. As a result, the position and speed controllers and the power source control circuit are provided in the static side servocontroller (static unit side servocontroller), and in the autonomous motor unit, only the current loop peculiar to the mounted motor and the power switch are provided. In this way, control of a motor mounted on a removable element such as the above-mentioned pallet and rotating bodies is enabled, and in addition, the physical size of separately removable parts can be reduced. Furthermore, as shown in FIG. 36, autonomous motor units $370_1$–$370_3$, on which are mounted direct current motor 371, induction motor 372 and synchronous motor 373, respectively, can be separately driven by a single static side servocontroller 361.

Figure 36:
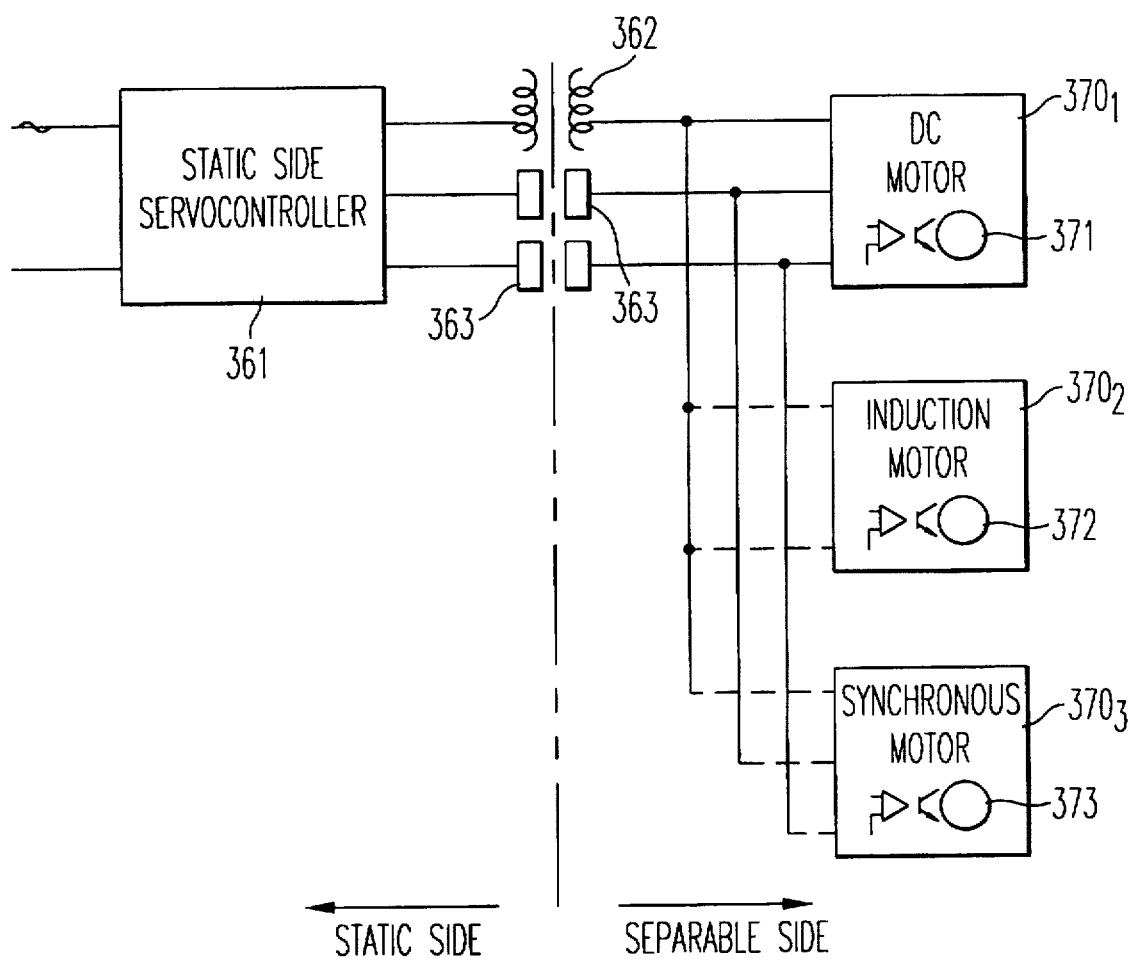
FIG. 36 is a view showing an example of coupling of autonomous motor units to a servo-controller in a static unit.
Figure 37A:
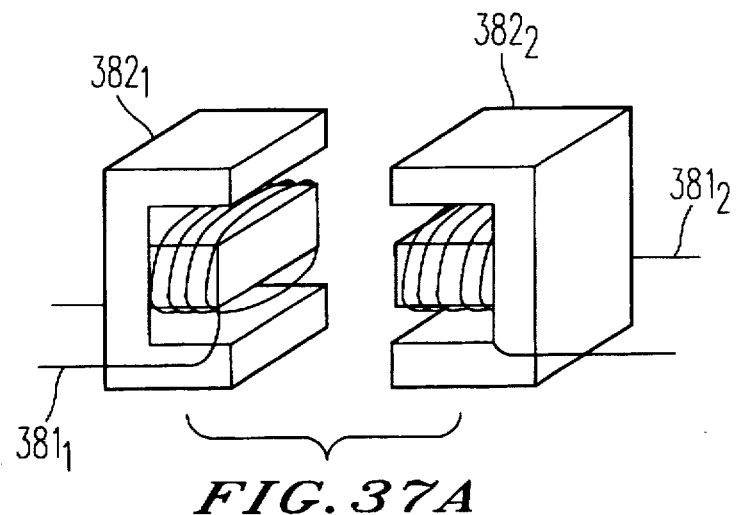
FIG. 37 is a perspective view showing a concrete construction of the separable high-frequency transformer shown in FIG. 35.
Figure 37B:
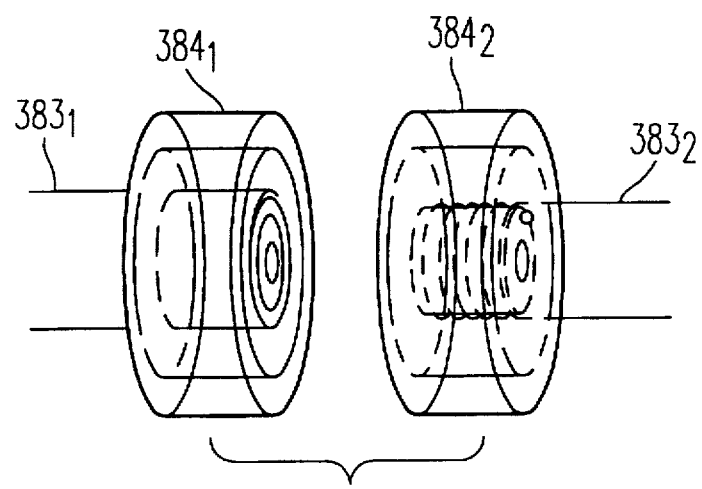
Figure 38:
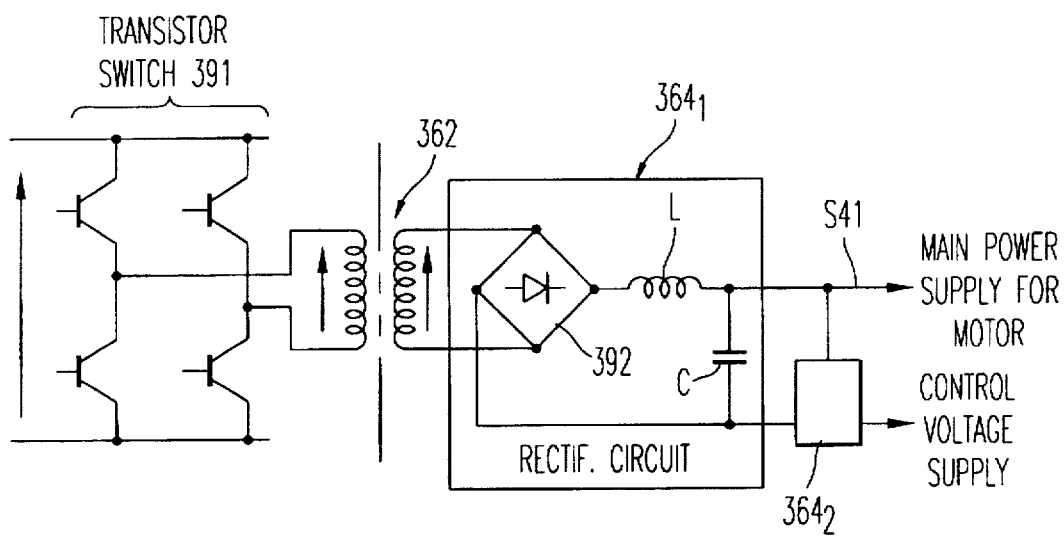
FIG. 38 is a view showing a circuit for noncontacting transmission of electric power from a static unit to an autonomous motor unit.

FIGS. 37A and 37B are each perspective views showing concrete constructions of the split-type high-frequency transformer 362 of FIG. 36, and FIG. 38 is a view illustrating the high-frequency excitation performed in the present embodiment.

The power that drives the motor $364_4$ is converted to a high-frequency form by transistor switches 391 which make up the high-frequency power generator $361_2$ within the static side servocontroller 361, passes through split-type transformer 362 and is transferred to the autonomous motor unit 364 through high-frequency electromagnetic induction. In the device shown in FIG. 37A, voltage transformation is performed according to the turn ratio of coils $381_1$, $381_2$ wound onto E-shaped cores $382_1$, $382_2$, respectively. In the device shown in FIG. 37B, the transformation occurs according to the turns ratio of the coils $383_1$, $383_2$ wound onto pot-cores $384_1$, $384_2$.

High-frequency power is rectified by rectification circuit $364_1$ within autonomous motor unit 364, and is converted to motor driving power after passing through power switch $364_3$. The primary side of split-type high-frequency transformer 362 undergoes high-frequency excitation by a rectangular wave (or sine wave) inverter within static side servocontroller 361. As a result, the rectangular wave (or sine wave) voltage occurs on the secondary side according to the turn ratio of the primary and secondary coils, and undergoes full-wave rectication by the rectification circuit $364_1$ made up of a high-frequency diode bridge 392 and an LC filter that is in turn made up of a reactor L and a smoothing capacitor C, the voltage thereby serving as a direct-current main power supply for motor drive. Further, the control voltage supply S16 for the communication and control circuits of the autonomous motor unit 364 is obtained through voltage stabilization by the voltage stabilizing converter $364_2$ that is a voltage regulator within the autonomous motor unit 364.

Particularly, when the power source on the power-receiving side must be stabilized, a detected voltage is fed back without direct contact in the same way as the above-mentioned position data. Based on this voltage feedback and speed feedback information, stabilization is performed by effecting control through amplitude modulation or pulse width modulation in the static side servocontroller 361.

In this way, motor control system that is both separate-typed and characterized by superior torque controllability can be realized. This system can be adapted for motor control by way of a rotating body as well as for separate-type control. However, in the former case, because power supply and signal transmission must both be performed coaxially with the rotation axis, some modifications are necessary. Power supply can be performed by using a pot-core-type split-core transformer shown in FIG. 37B. Signal transfer must be performed by an optical pulse communication system or a high-frequency electromagnetic induction communication system arranged coaxially with the pot-core of the split-core transformer.

Figure 39:
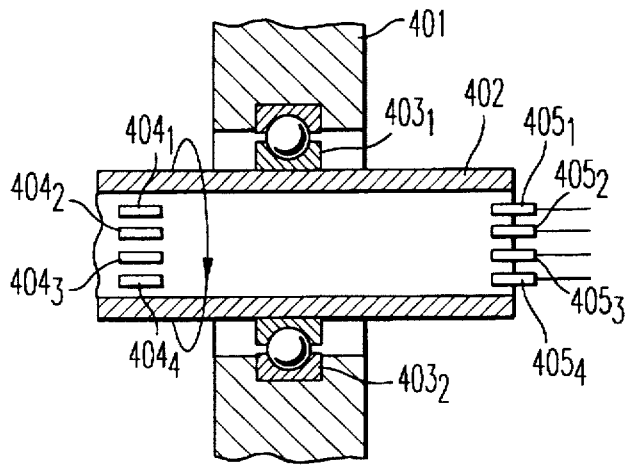
FIG. 39 is a view showing noncontacting signal transmission between an autonomous motor unit and a static unit by an optical coupler.

As shown in FIG. 39, signal transfer by optical pulse can be performed through a hollow rotating shaft using a plurality of optical couplers having various light-emitting and light-sensing wavelength characteristics.

Within the interior of rotating shaft 402 rotatably secured by ball bearings $403_1$, $403_2$ in a static base, optical elements $404_1$–$404_4$ and $405_1$–$405_4$, which are light-emitting elements or light-receiving elements, are provided in an opposing relationship to form optical couplers. The optical elements $404_1$–$404_4$ and $405_1$–$405_4$ that make up optical couplers are selected so that the peaks of light-emitting wavelengths and light-receiving wavelengths of the optical couplers differ from those of each other optical couplers so as to prevent interference of the transmission signals.

Figure 40A:
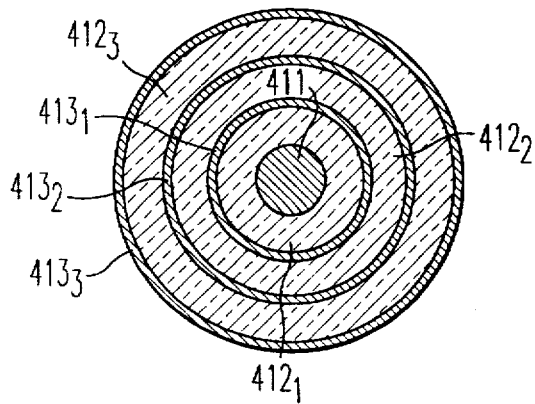
FIG. 40 is a diagram illustrating a multi-channel light signal transfer path of a coaxial arrangement.

As shown in FIG. 40A, in another example using optical pulses, light-emitting and light-receiving elements are coaxially arranged with shielding to prevent influence. In this case, the light-emitting wavelengths and light-receiving wavelengths for the plurality of optical couplers can be the same.

FIG. 40A shows the composition of the rotating unit side, in which light-guiding members $412_1$–$412_3$ are formed in cylindrical shape coaxial with the rotation axis 411 having radii different from each other member, and the outer circumference of each of the light-guiding members $412_1$–$412_3$ is covered with a light-shielding member. In the static side shown in FIG. 40B, light-guiding members $414_1$–$414_3$ constituting optical couplers are embeded in light-shielding materials $416_1$–$416_3$ formed in the same shape as light-guiding members $412_1$–$412_3$ around the circumference of the bearing 415. Light beams that passes through the light-guiding members that make up one component of the optical coupler propagates to the opposing light-guiding members provided in the other component without influencing each other beam by virtue of light-shielding members $413_1$–$413_3$ and light-shielding material $416_1$–$416_3$.

Signal transfer by optical pulses is effected by means of these light-guiding members, and light-guiding members can be constructed with light-emitting element and light receiving elements.

Signal transfer by high frequency electromagnetic induction is preferably used in a case in which a worsening ambience deteriorates the reliability of optical pulse communication, and in the same way as the optical pulse transmission method shown in FIG. 39 and FIG. 40, either a method in which the split cores are arranged coaxially in a radial direction or a method in which they are arranged in the axial direction is possible.

Figure 40B:
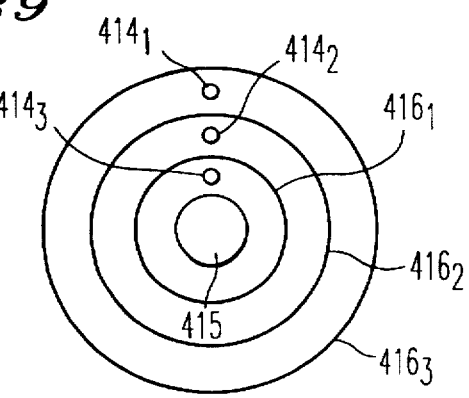

It is possible that each of the above-described split-core high-frequency transformers and each coupler are formed as an integrated unit, and control of an autonomous motor unit by way of a rotating body can be easily realized by arranging on the same shaft the coupler shown in FIGS. 40A and 40B and the split-core high-frequency transformers of pot-core configuration $384_1$, $384_2$ shown in FIG. 37B.

Figure 41:
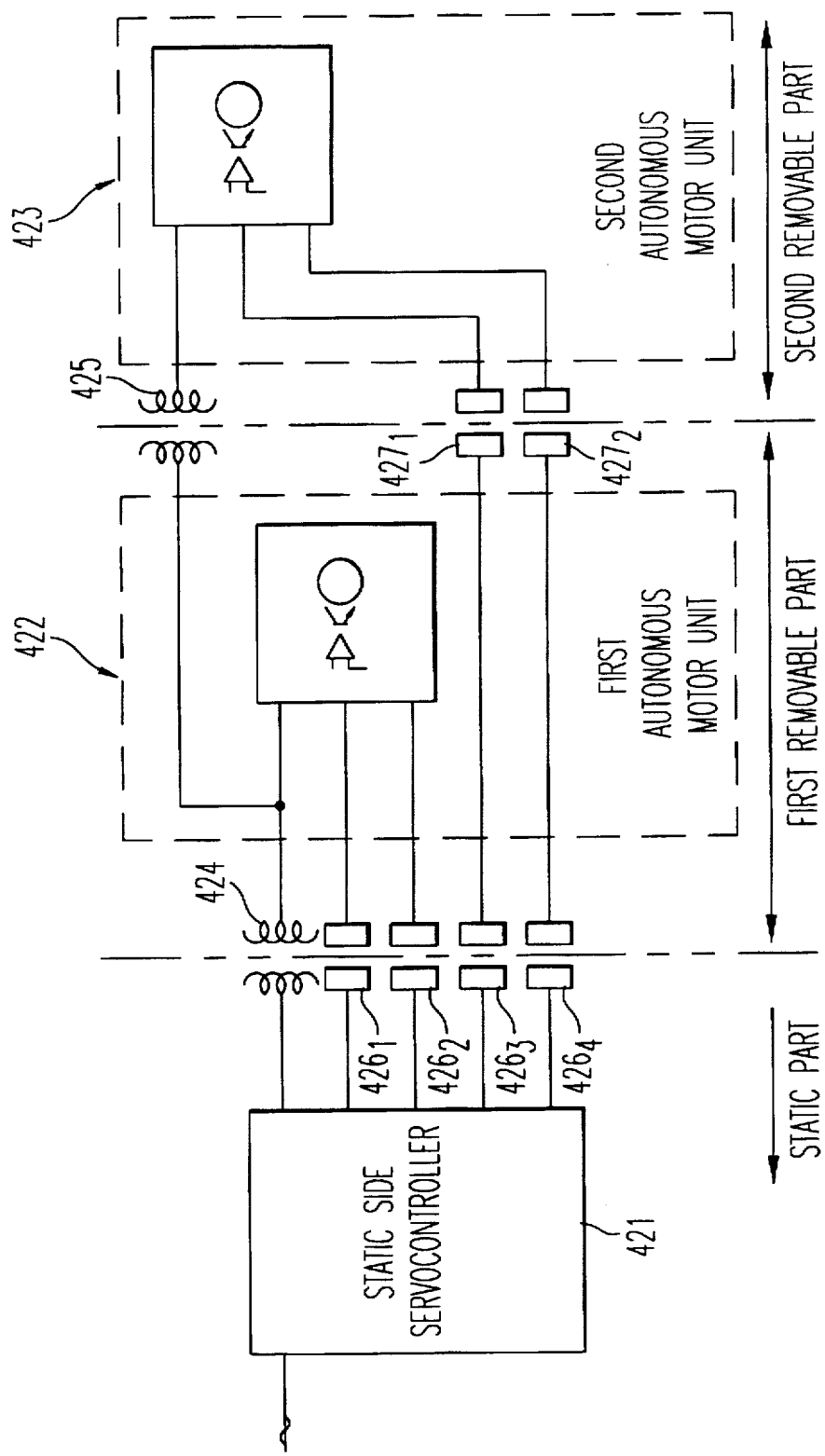
FIG. 41 is a view showing an embodiment of multistage connections of the noncontacting power transfer apparatus and the noncontacting signal transfer apparatus.

FIG. 41 is a block diagram showing a noncontacting power transmission system according to the fifteenth embodiment of the present invention.

In the present embodiment, power supply as well as torque control is performed both for a first autonomous motor unit 422 and a second autonomous motor unit 423 by a single static side servocontroller 421. Because the control circuit of the servocontroller 421 on the static side and the constitution of the first autonomous motor unit 422 and the second autonomous motor unit 423 are the same as are shown in FIG. 35, only the principal parts and operation will be here explained.

The high-frequency power to be supplied from the static side servocontroller 421 is sent to the first autonomous motor unit 422 by way of a first split-core high-frequency transformer 424, and to the second autonomous motor unit 423 by way of a second split-core high-frequency transformer 425. To perform control, couplers $426_1$–$426_4$ are provided between the static side servocontroller 421 and the first autonomous motor unit 422, and couplers $427_1$–$427_2$ are provided between the first autonomous motor unit 422 and the second autonomous motor unit 423. Transmission and reception of torque commands and feedback information for the first autonomous motor unit 422 is carried out by couplers $426_1$, $426_2$, and for the second autonomous motor unit 423, transmission and reception of torque commands and feedback information is carried out by couplers $426_3$, $426_4$, $427_1$, $427_2$.

As described above, because power supply and torque control for an autonomous motor unit are effected by way of another autonomous motor unit in this embodiment, the transmission system enables effective driving and removing a device such as a multi-articulated robot in which the autonomous motor units are combined serially in multiple stages. Similarly it is also possible that an autonomous motor unit drives a movable member coupled to the autonomous motor unit.

Furthermore, in autonomous motor units not intercombined in multiple stages and provided in paralle, it is of course possible to perform contorl not by way of an autonomous motor unit but directly by the static side servocontroller.

The novel separate-type motor control method according to the present invention as shown in each of the above-explained embodiments enables realizing decentralization of autonomous units through the motor drivability of functional elements represented by processing machine ATC tools, and robot end effectors; and positioning and jig automatizations on pallets which could not be achieved with a high degree of reliability with a mechanical framework or electrical framework of connection and disconnection of connectors with electrodes, thereby enabling comprehensive automatization of a control system.

Control in the form of controlling a motor on a rotating body that performs multiple rotations (for example, the motorization of a lathe head chucking member or linear drive by motor on a tool post installed at the shaft end of a machine tool) is also possible.

Furthermore, as described above, by appropriately dividing the controller into a static side and a motor side (machine-mounted side), the physical size of a separately removable part can be reduced, and any autonomous functional unit with a direct current motor, induction motor, or synchronous motor can be remotely driven by a single static side servocontroller.

The apparatus according to the fourteenth and fifteenth embodiments transfer power by means of high-frequency electromagnetic induction using a split-core transformer and perform transmission of torque commands in the form of optical transmission or high-frequency electromagnetic induction transmission, and consequently can stand up to severe conditions such as subjection to water or oil, do not give rise to sparks or electrode damage, and feature the capability to be physically split or separated on hot lines. This is a device that can meet the recently growing demand for autonomous machine elements with mounted motors or for motor control on a rotating body.

The present invention also provides a power source controller having wide interchangeability, because direct current motors, induction motors, and synchronous motors can be treated collectively as torque generators regardless of motor type.

By using these embodiments, the above-described effects can be attained in the following specific cases to effect unprecedented improvements and a technological breakthrough in the field.

1) Motor control of position indexing for a workpiece on a pallet.
2) Wireless drive for power and signals for each axis of motor actuators of a multiarticulated robot.
3) Wireless tool drive in an automatic tool exchange of a machine tool (machining center).
4) Control of motor actuators attached to the main shaft tip of a machine tool involving multiple rotation (for example, motorization of a chucking member at a lathe head or a tool post on a main shaft).
5) Control particularly when torque controllability is required for the motor, and moreover, when the pallet on which the motor is mounted must itself be able to move autonomously, for example, control when the motor is used for centering and clamping of a workpiece on a work pallet.
6) Control-signal transmission and power supply to various electric loads including motors in chambers isolated by transparent material such as glass or by nonmagnetic metals, such as in a cleanroom.
7) Control signal transmission and power supply to various electric loads including motors under conditions such as a vacuum or underwater, in which power supply through eelctrode contact is impossible.

In particular, of the above applications, in uses in which a motor is employed as a torque generator such as in chucking or centering and clamping the present invention can be effectively used without alteration, because all motors are understood in the present invention to be essentially torque generators and the separate-type control is exercised.

Because the fourteenth and fifteenth embodiments are constructed as explained above, they exhibit the following effects:

The embodiments have the effect of enabling miniaturization of an autonomous motor unit that is removable, increasing the capacity to realize remotely controlled motors, as well as of increasing the range of use. The present invention has the further effect that, because the construction of the static side servocontroller that controls an autonomous motor unit is unaffected by the motor type, the same static side servocontroller can be used for any type of motor, and the types of the static side servocontrollers can be minimized, thereby enabling more efficient construction. The present invention also has the effect that the separately controlled motors can stand up to severe conditions such as subjection to water or oil, do not give rise to sparks or electrode damage, and feature the capability of being physically separated and not connected on hot lines.

A noncontacting power supply device of open-close core according to the sixteenth embodiment of the present invention will next explained.

Figure 15B:
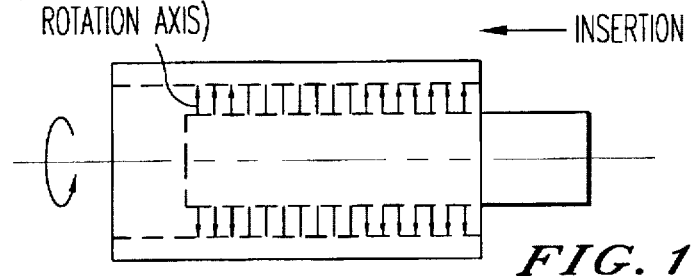

The present embodiment relates to an apparatus that communicates information and supplies power from a static unit side to an autonomous removable body not having an internal power supply (for example, a work pallet for a machining center) without using any electrical contact. A conventionally proposed and realized noncontacting power supply apparatus using high-frequency electromagnetic induction was of the face-to-face type (or the matching surface type) of magnetic substances as shown in FIG. 14 or of the insert type (or the fit-surface type) as shown in FIG. 15, and because the length of the air gap in the main magnetic path is determined by the distance between the static part (power supply side) and the moving body (the power receiving side), positioning accuracy for power supply directly affected power supply efficiency. Accordingly, the realization of efficient power transmission and information transmission required improved precision machining in manufacturing the matching surfaces (fitted surfaces), and achievement of accurate positioning of the distance between the power supply side and the power receiving side, as well as close maintenance during use to remove from the matching surfaces (fitted surfaces) any extraneous materials occurring in the surrounding ambience (metal chips, oil, water, etc.).

The present embodiment provides an apparatus and a method that can solve the problems encountered in the prior art, in which the high-frequency electromagnetic coupling between primary and secondary coils does not vary even though the relative positions of the power supplier and the power receiver may change, and in which power supply and information transmission can be performed stably and unaffected by interposition of extraneous material or the accuracy of manufacture.

Figure 42:
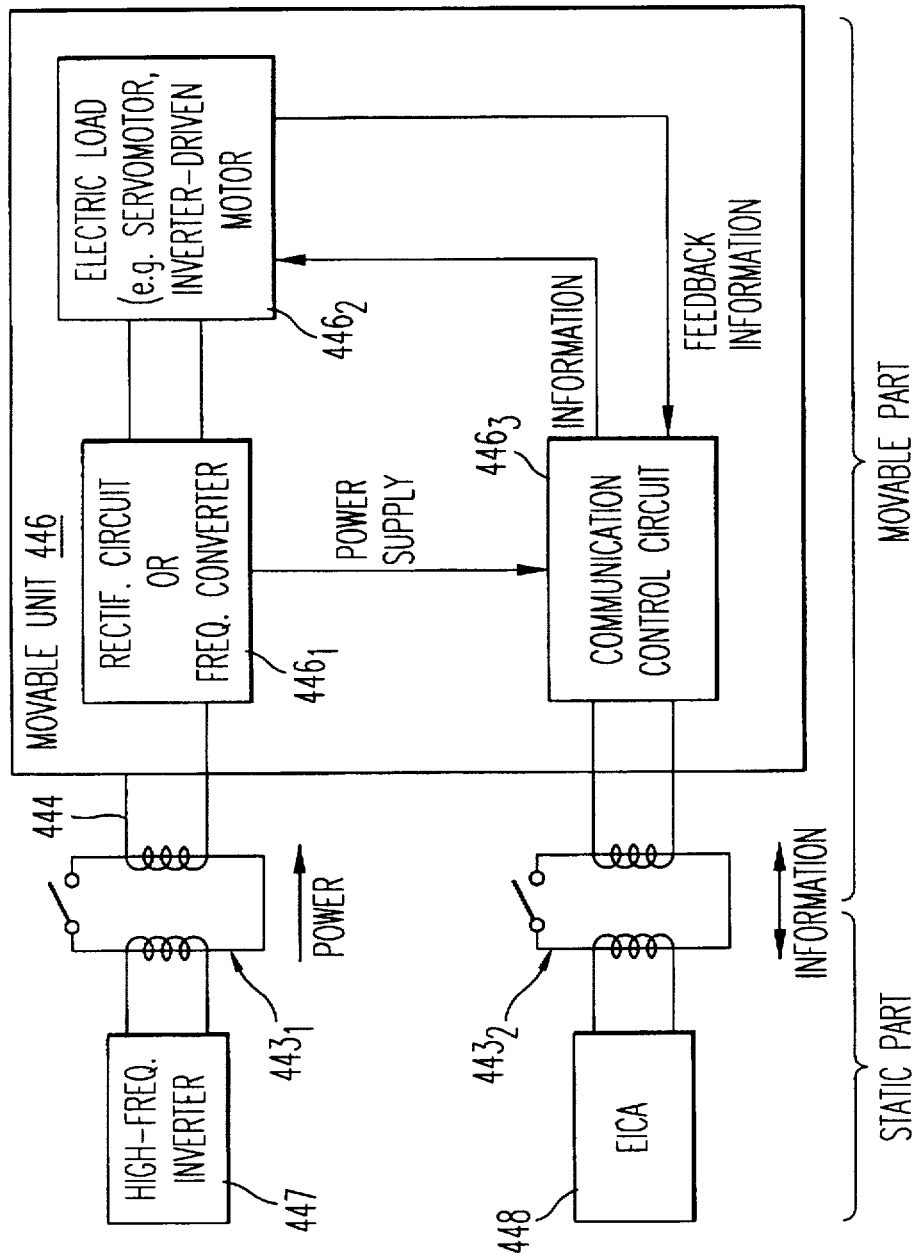
FIG. 42 is a schematic diagram showing the construction of an open-close core type noncontacting power supply system according to the present invention.

FIG. 42 is a schematic diagram of such an open-close core noncontacting power supply system. Between a movable unit 446 and a static unit, a magnetic circuit made up of high-frequency magnetic cores $443_1$, $443_2$ is provided. Core $443_1$ is for power transfer, and undergoes excitation by high-frequency inverter 447. Core $443_1$ has an open-close portion, and in order to transfer power to the movable unit, the open-close portion is mechanically opened, the movable unit is moved, secondary coil $444_1$ is inserted from the opened portion of the core such that the magnetic path links with the secondary coil, and the core $443_1$ is mechanically closed. The induction current induced in the secondary coil is rectified by the rectification circuit $446_1$, or converted to a desired frequency by the frequency converter circuit $446_1$ and supplied to an electric load $446_2$.

In the same way, communication between the electric load $446_2$ and the high-frequency electromagnetic induction communication apparatus 448 (EICA) is performed by electromagnetic induction between coils wound on a core $443_2$ on the static unit side and the movable unit 446. A feedback signal transmitted from the electric load $446_2$ to the static unit is converted to a pulse train by a communication control circuit $446_3$. A signal transmitted from the static unit to the movable unit 446 is converted to an analog signal by the communication control circuit $446_3$ and sent to the electric load. When an operation is completed, the cores is opened, the movable unit 446 is removed, and the coil on the movable unit side is pulled out. FIG. 43 shows the concrete structure of the magnetic path made up of coils and magnetic substance that causes this high-frequency electromagnetic induction. The magnetic path has an open-close structure using a slider. Here, a high-frequency magnetic slab 453b is installed at the end of a slide structure 452 in the static unit 451, which when closed, forms a part of the main magnetic path of a high-frequency magnetic core 453a. According to the predetermined insertion sequence to have secondary coil 454 (treated by mold-forming etc.) on the movable unit side link with the main magnetic path of the primary coil 455 for high-frequency magnetic coupling, the slide structure 452 first moves high-frequency magnetic slab 453b in a straight line before power supply begins. The movable unit moves (or is moved) within the range in which the secondary coil can completely link with the main magnetic path of the primary coil when the magnetic path is closed, and when the insertion of the secondary coil 454 is confirmed on the static unit side by some method, the slide structure 452 moves the high-frequency magnetic slab 453 in a straight line to its original position and closes the magnetic path. Further, after the closure of the magnetic path has been either mechanically or optically confirmed by a component not shown in the figure, the static unit 451 is operated by a high-frequency inverter (not shown in the figure) to excite the primary coil. In this way, an electromotive force voltage is induced in the linked mold-formed secondary coil by high-frequency electromagnetic induction, thereby enabling power supply to the autonomous movable unit.

Figures 44A, 44B:
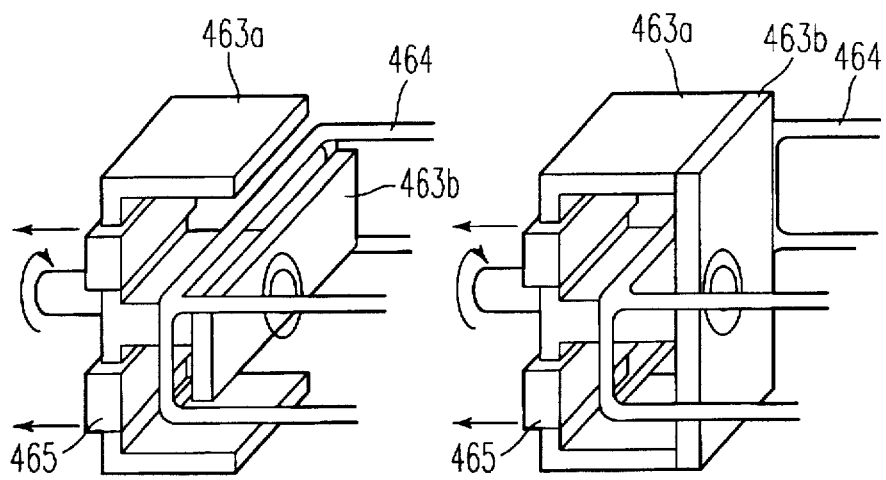
FIG. 44 is structural view of another embodiment of the noncontacting power supply system of the present invention.

FIG. 44 shows a modified embodiment in which the open-close structure of the main magnetic path is made rotatable, FIG. 44A showing the state in which the secondary coil 464 of the movable unit is inserted, and FIG. 44B showing a subsequent state in which the high-frequency magnetic slab 463b has closed the main magnetic path by rotation.

In any of the above-described constructions, nearly all of the magnetic flux produced by the primary coil passes through the high-frequency magnetic substance, and as a result, the size of an air gap in the magnetic path and transmission failure occurring by the gap depends on the manner of closing the path and the geometric structure, and not on the accuracy of the positioning of the movable unit, on which the secondary coil is installed, relative to the power supply unit (static unit) made up of the primary coil and the high-frequency magnetic material. In this embodiment as well, since it is impossible to completely vanish the length of the air gap in the magnetic path and there is also the possibility that extraneous matter (oil, water, chips) will enter the gap, strong electromagnetic coupling such as the coupling performed by a toroidal magnetic circuit, in which leakage of flux hardly occurs, cannot be realized, but as described above, compared to the method of the prior art in which the possibility of interposition over the entire contact surfaces by a contaminating substance is extremely high, an appreciable improvement can be realized. Furthermore, while the above description has focused on power supply, through information transfer using high-frequency electromagnetic induction, stable communication can obviously be ensured through the use of the same principal and construction.

Figures 45A, 45B:
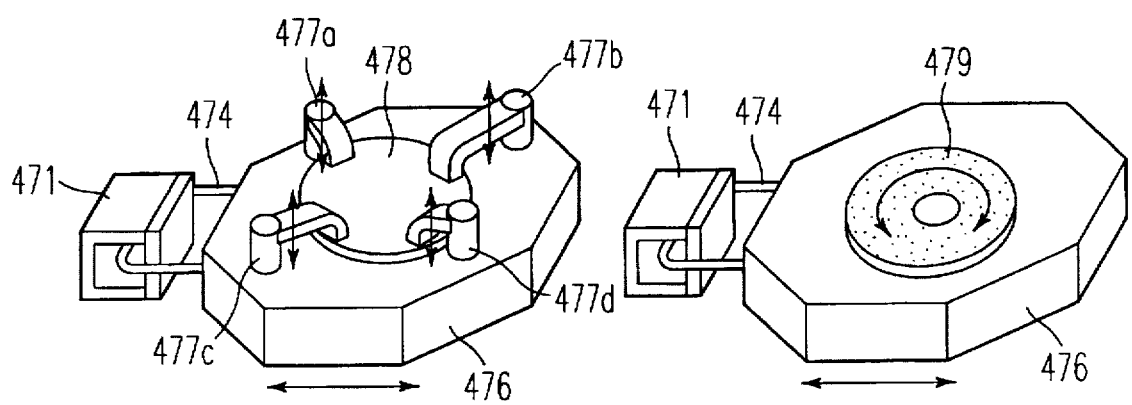
FIG. 45 is a view showing an embodiment in which the movable part is a work pallet.

FIGS. 45A and 45B show embodiments of the movable units 476 of the present invention used as work pallets in the machining tool field.

FIG. 45A shows an example of automatic clamp devices 477a–477d with actuators that convert electric power to oil pressure by using the information and power supplied by way of a secondary coil 474 from a static unit 471. In this way, the operation of securing a workpiece 478 to a pallet, which has hitherto been a manual operation, can be automatized.

FIG. 45B shows an example in which a table 479 on a pallet is made to rotate by providing a servocontroller and a servomotor in the interior of the pallet and driving them using the information and power received by way of the secondary coil 474 from the static unit 471. In this way, addition of a servo axis for working (for example, addition of a rotation axis or a tilt axis of a workpiece) can be attained by the application to the pallet. Of course, during working and cutting on a machining center, it is impossible to prevent cut chips or coolant from fouling the magnetic substance or mold-formed coil, but in this case, the extraneous matter can be removed by air blowing or vigorous flushing with a coolant of low electric conductivity.

The present embodiment solves the problems inherent in the previously proposed noncontacting power supply method through high-frequency electromagnetic induction, i.e., the problem that the efficiency of power transfer is greatly affected by the accuracy in positioning of the power supply side relative to the power receiving side, and the difficulty of maintaining contact surfaces for power supply and power reception against the ambient oil, water, and cut metal debris, and thereby provides a stable and highly reliable method.

Furthermore, the present invention, by taking advantage of the fact that the state of electromagnetic induction coupling between the coils is virtually unaffected by a degree of variation in the relative positions of the static unit and movable unit during power supply, provides the effect of allowing a stable power supply in uses in which power supply by conventional wiring cannot be used due to fatigue caused by the rapid short-stroke movement of the movable body in one-dimensional, two-dimensional, or three dimensional directions.

What is claimed is:

1. A main-shaft-end information transmission apparatus for detecting tip information at the tip of the main shaft of a motor that rotates at high speed and transmitting the tip information to a static unit, comprising:

sensor means installed on the main shaft for detecting and outputting the tip information;

power source means installed on the main shaft for rectifying a high-frequency alternating current and for providing a stabilized power supply to the sensor means;

a noncontacting power transfer apparatus for transmitting high-frequency power from said static unit to the power source means without direct electric contact; and a noncontacting signal transfer apparatus for transmitting detection information detected by said sensor means to said static unit without direct electric contact, wherein said noncontacting signal transfer apparatus comprises;

electric-to-light conversion means fixed to a transmission side for converting an electric signal to be transmitted to optical signals distributed uniformly in all directions with respect to the axis of rotation of said main shaft; and photoelectric conversion means fixed to a reception side for receiving an optical signal emitted by said electric-to-light conversion means and converting it to an electric signal.

2. The apparatus according to claim 1, wherein, when the tip information outputted by the sensor means is a digital signal, a first conversion means that converts the digital signal to a pulse train is provided on the main shaft; when the tip information is an analog signal, a second conversation means that converts the analog signal to the pulse train of a digital signal is provided on the main shaft; and the pulse train is transmitted to the static unit through a noncontacting signal transfer apparatus.

3. The apparatus according to claim 2 wherein the second conversion means is one of a pulse width modulation means, and the pulse width modulated wave is demodulated to an analog signal in the static unit, and a clock count digital measurement means for measuring the pulse width to provide the detected value of the tip information.

4. The apparatus according to claim 1 wherein the tip information to be detected is information necessary for one of measurement of the gap between a workpiece and a tool tip, or for remote measurement of a tool-tip protrusion of a infeed tool for variable boring radius.

5. The apparatus according to claim 1 wherein the tip information to be detected is information necessary for online surveillance of the state of general blade tools, particularly tip temperature information, vibration information, and acoustic emission information.

6. The apparatus according to claim 1 wherein the tip information to be detected is information necessary for feedback of a sequence signal, particularly a limit switch signal of an ATC collet chuck member.

7. The apparatus according to claim 1 wherein the tip information to be detected is information necessary for online monitoring of the grasping pressure acting on a workpiece in a main shaft tip chucking device and for closed loop control of chucking pressure.

8. The apparatus according to claim 1 wherein the tip information to be detected is information necessary for measurement physical values on the rotation shaft for measurement of shaft vibration values and rotor temperature.

9. A main-shaft-end information transmission apparatus for detecting tip information at the tip of the main shaft of a motor that rotates at high speed and transmitting the tip information to a static unit, comprising:

sensor means installed on the main shaft for detecting the tip information;

power source means installed on the main shaft for rectifying a high-frequency alternating current and providing to the sensor means a stabilized power supply;

a noncontacting power transfer apparatus for transmitting high-frequency power from said static unit to the power source means without direct electric contact; and a noncontacting signal transfer apparatus for transmitting detection information detected by said sensor means to said static unit without direct electric contact, wherein said noncontacting signal transfer apparatus comprises:

an electric-to-light conversion element fixed to the transmission side for converting an electric signal to be sent to an optical signal, and photoelectric conversion means fixed to the reception side for converting an optical signal emitted by the electric-to-light conversion element to an electric signal; and the photoelectric conversion means having an incident plane distributed uniformly in all directions with respect to the axis of rotation of the rotatable unit, and the electric-to-light conversion element being located adjacent to the incident plane, said transmission side being the side that transmits electric signals and said reception side being the side that receives those signals.

10. The apparatus according to claim 9, wherein, when the tip information outputted by the sensor means is a digital signal, a first conversion means that coverts the digital signal to a pulse train is provided on the main shaft; when the tip information is an analog signal, a second conversion means that converts the analog signal to the pulse train of a digital signal is provided on the main shaft; and the pulse train is transmitted to the static unit through said noncontacting signal transfer apparatus.

11. The apparatus according to claim 10, wherein the second conversion means is one of a pulse width modulation means, and the pulse width modulated wave is demodulated to an analog signal in the static unit, and a clock count digital measurement means for measuring the pulse width to provide the detected value of the tip information.

12. The apparatus according to claim 9, wherein the tip information to be detected is information necessary for one of measurement of the gap between a workpiece and a tool tip, and for remote measurement of a tool-tip protrusion of a infeed tool for variable boring radius.

13. The apparatus according to claim 9, wherein the tip information to be detected is information necessary for online surveillance of the state of general blade tools, particularly tip temperature information, vibration information, and acoustic emission information.

14. The apparatus according to claim 9, wherein the tip information to be detected is information necessary for feedback of a sequence signal, particularly a limit switch signal of an ATC collet chuck member.

15. The apparatus according to claim 9, wherein the tip information to be detected is information necessary for online monitoring of the grasping pressure acting on a workpiece in a main shaft tip chucking device and for closed loop control of chucking pressure.

16. The apparatus according to claim 9, wherein the tip information to be detected is information necessary for measurement of physical values on the rotation shaft for measurement of shaft vibration values and rotor temperature.

* * * * *